United States Patent [19]
Doi et al.

[11] Patent Number: 5,982,915
[45] Date of Patent: Nov. 9, 1999

[54] METHOD OF DETECTING INTERVAL CHANGES IN CHEST RADIOGRAPHS UTILIZING TEMPORAL SUBTRACTION COMBINED WITH AUTOMATED INITIAL MATCHING OF BLURRED LOW RESOLUTION IMAGES

[75] Inventors: Kunio Doi, Willowbrook; Takayuki Ishida, Westmont; Shigehiko Katsuragawa, Chicago, all of Ill.

[73] Assignee: Arch Development Corporation, Chicago, Ill.

[21] Appl. No.: 08/900,362

[22] Filed: Jul. 25, 1997

[51] Int. Cl.[6] .................................................. G06K 9/00
[52] U.S. Cl. .......................... 382/130; 382/132; 382/278; 382/299
[58] Field of Search ...................... 382/130, 278, 382/299, 294, 132; 128/922; 378/98.11, 98.12

[56] References Cited

U.S. PATENT DOCUMENTS

| | | | |
|---|---|---|---|
| 4,468,698 | 8/1984 | Kavoussi et al. | 378/98.12 |
| 4,641,352 | 2/1987 | Fenster et al. | 382/130 |
| 4,644,582 | 2/1987 | Morishita et al. | 382/130 |
| 4,710,875 | 12/1987 | Nakajima et al. | 378/162 |
| 4,899,393 | 2/1990 | Morishita et al. | 382/130 |
| 5,179,441 | 1/1993 | Anderson et al. | 348/43 |
| 5,359,513 | 10/1994 | Kano et al. | 382/130 |
| 5,579,444 | 11/1996 | Dalziel et al. | 382/153 |
| 5,604,819 | 2/1997 | Barnard | 382/151 |
| 5,734,740 | 3/1998 | Benn et al. | 382/132 |

*Primary Examiner*—Jon Chang
*Attorney, Agent, or Firm*—Oblon, Spivak, McClelland, Maier & Neustadt, P.C.

[57] ABSTRACT

A method and computerized automated initial image matching technique for enhancing detection of interval changes between temporally subsequent radiographic images via image subtraction. The method includes the steps of digitizing images, normalizing density and contrast in the digital images, correcting for lateral inclination in the digital images, detecting edges of a same feature in each image, converting the images into low resolution matrices, blurring the low resolution images, segmenting portions of the blurred low resolution matrices based on the detected edges, matching the digital images based on a cross-correlation match between the segmented portions, performing non-linear warping to further match Regions of Interest (ROI), and performing image subtraction between the matched digital images. The low resolution matrices are greater than 64×64 in size and are produced by averaging. Blurring of the low resolution matrices is performed via a Gaussian filter that removes fine structures in each image such as small vessels, bronchia, etc. The method may be performed by a computer system according to instructions stored on a computer readable medium.

38 Claims, 29 Drawing Sheets

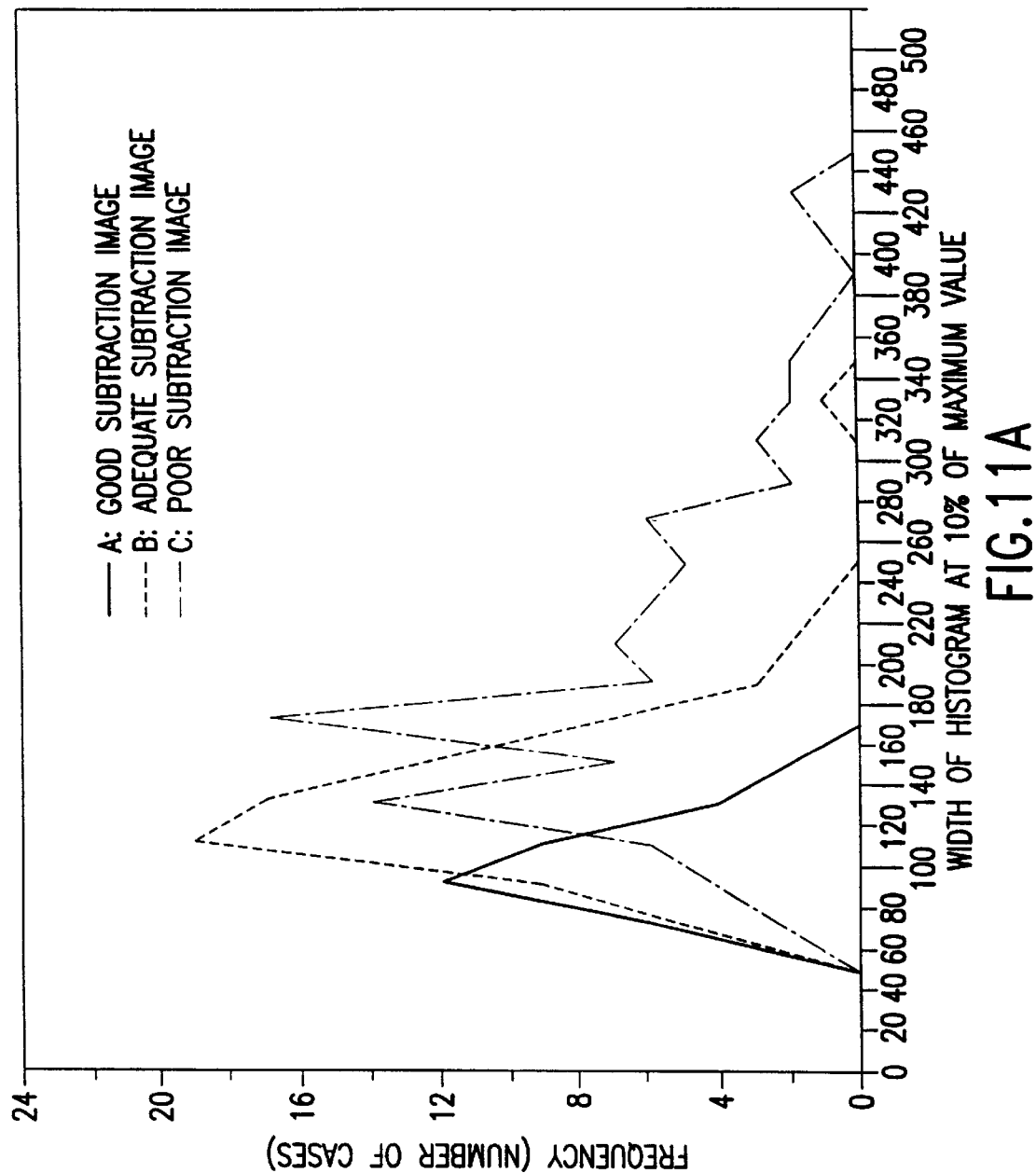

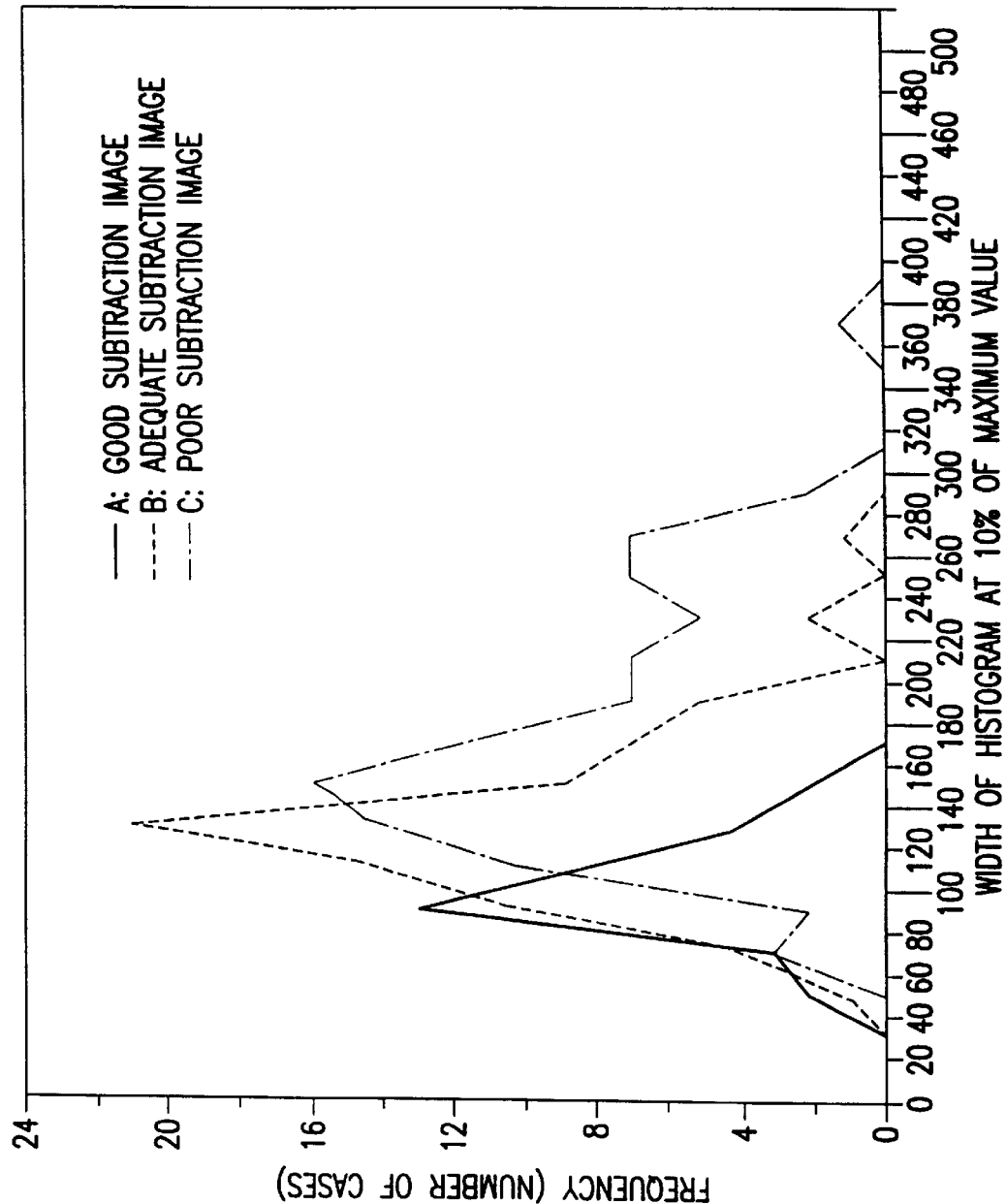

METHOD OF DETECTING INTERVAL CHANGES IN CHEST RADIOGRAPHS UTILIZING TEMPORAL SUBTRACTION COMBINED WITH AUTOMATED INITIAL MATCHING OF BLURRED LOW RESOLUTION IMAGES

The present invention was made in part with U.S. government support under Grant Nos. (USPHS) CA62625, CA60187, CA64370, MRH DAMD (U.S. ARMY) 17-93-J-3021, and 71-96-1-6228. The U.S. government has certain rights in the invention.

TITLE OF THE INVENTION

BACKGROUND OF THE INVENTION

Field of the Invention

The present invention relates to computer aided diagnosis (CAD) techniques for the detection of interval changes and automated image matching of radiographs. The invention is also related to any method or process that requires detection of interval changes or a matching of images.

The present invention generally relates to CAD techniques for automated detection of abnormalities in digital images, for example as disclosed in one or more of U.S. Pat. Nos. 4,839,807; 4,841,555; 4,851,984; 4,875,165; 4,907, 156; 4,918,534; 5,072,384; 5,133,020; 5,150,292; 5,224, 177; 5,289,374; 5,319,549; 5,343,390; 5,359,513; 5,452, 367; 5,463,548; 5,491,627; 5,537,485; 5,598,481; 5,622, 171; 5,638,458; 5,668,888; 5,657,362; 5,790,690; 5,666, 424; 5,832,103; and 5,673,332; as well as U.S. applications Ser. Nos. 08/158,388; 08,173,935; 08/220,917; 08/398,307; 08/523,210; 08/536,149; 08/562,087; 08/757,611; 08/758, 438; 08/900,191; 08/900,361; 08/900,188; 08/900,192; and 08/900,189. The present invention includes use of technologies referenced and described therein, as well as described in the references identified in the appended APPENDIX and cross-referenced throughout the specification by reference to the number, in brackets, of the respective reference listed in the APPENDIX, the entire contents of which, including the related patents and applications listed above and references listed in the APPENDIX, are incorporated herein by reference.

The present invention is an improvement to U.S. Pat. No. 5,359,513 and includes use of technologies referenced and described therein, the entire contents of which, including the related patents and applications listed above, are now incorporated herein by reference.

DISCUSSION OF THE BACKGROUND

The aim of computer aided diagnosis is to alert the radiologist by indicating potential problems, lesions, malformities, and/or providing quantitative information as a second opinion. Since the mid-1980's, a number of computerized schemes for CAD have been under development for chest radiography, mammography, angiography, and bone radiography.

In chest radiography, several computerized schemes have been applied to the detection and classification of pneumoconioses and other interstitial diseases, detection of lung nodules, heart size measurement, detection of pneumothorax (see U.S. application Ser. No. 08/174,175). However, development of CAD is still at an early stage. Therefore, it is necessary to further improve the performance of CAD based on an understanding of image features of normal and abnormal patterns appearing on radiographs.

Chest radiographs are commonly interpreted by reading a chest radiograph in light of a previous chest radiograph of the same patient. Changes detected between the current chest radiograph and the previous chest radiograph are known as interval changes and are highly effective in determining changes in pulmonary infiltrates, changes in the size of tumor masses, changes in pleural effusions, changes in heart sizes, air fluid levels, and amounts or size of pneumothorax. See, A. Kano, K. Doi, H. MacMahon, D. D. Hassell, M. L. Giger, "Digital image subtraction of temporally sequential chest images for detection of interval change," Med. Phy. 21:453–461 (1994), hereinafter A. Kano et al.; and, M. C. Difazio, H. MacMahon, XW Xu, P. Tsai, J. Shiraishi, S. G. Armato III, and K. Doi, "Digital chest radiography: Effect of temporal subtraction images on detection accuracy," Radiology 202, 447–452 (1977), hereinafter M. C. Difazio et al. However, it is a difficult task for radiologists to identify subtle interval changes on chest radiographs because lesions can be overlapped to anatomical structures such as ribs, vessels, or organs such as the heart. Also, mucular movement, such as motions of the diaphragm during normal breathing, can make a diagnosis of interval changes in radiographs more difficult.

In making comparison of chest radiographs, temporal subtraction has been utilized between sequential chest radiographs which is helpful in the detection of subtle changes in the chest radiographs (see M. C. Difazio et al.). In the performance of current temporal subtraction methods and schemes (see A. Kano et al.), it has been shown that reasonably good quality occurs in approximately 70% of subtraction images (see U.S. Pat. No. 5,359,513).

However, poor performance in detection of interval changes in sequential chest radiographs occurs, in some cases, as a result of severe misregistration between sequential radiographs. In the existing temporal subtraction scheme (see U.S. Pat. No. 5,359,513), a global shift value, which corresponds to the difference in the two coordinate systems between the current and previous images, is determined by evaluating a crossing point of a midline of a chest with a top of the lungs in each image. Therefore, if the midline of the chest or the top of the lungs is incorrectly identified, severe misregistration occurs.

SUMMARY OF THE INVENTION

Accordingly, it is an object of this invention to provide a method for registration of sequential radiographs to improve detection of interval changes.

It is another object of the invention to utilize low resolution images to determine registration of radiographs.

It is another object of the present invention to utilize Gaussian blurring of the low resolution images to improve registration.

These and other objects are achieved according to the present invention by providing a novel method for detection of interval changes in chest radiographs utilizing temporal subtraction combined with automated initial image matching including the steps of digitizing chest images, normalizing density and contrast of the digitized images, correcting for lateral inclination, detecting rib cage edges based on an image profile analysis, converting the digitized images to low resolution, blurring the low resolution images via a Gaussian filter, segmenting using rib cage edges, determining a global shift value between the low resolution images using a cross-correlation technique, performing non-linear geometric image warping (see A. Kano et al.), and performing image subtraction to determine interval changes.

BRIEF DESCRIPTION OF THE DRAWINGS

A more complete appreciation of the invention and many of the attendant advantages thereof will be more readily obtained as the same becomes better understood by reference to the following detailed description when considered in connection with the accompanying drawings, wherein:

FIG. 11(a) is a graph illustrating distributions of histogram widths for three groups of subtraction images obtained by a previous subtraction scheme;

FIG. 11(b) is a graph illustrating distributions histogram widths for the three groups of subtraction images obtained by the improved temporal subtraction method according to the present invention.

DESCRIPTION OF THE PREFERRED EMBODIMENTS

The present invention is directed to an improved method of temporal subtraction based on an initial image matching technique that determines a global shift value before applying a non-linear geometric warping technique to improve matching between current and previous chest radiographic images. The present method improves the overall performance of a temporal subtraction and enhances detection of subtle changes in chest radiographs. When applied to cases in which the subtraction scheme resulted in poor quality subtraction, over 40% of those cases were improved by applying the automated initial image matching technique of the present invention.

Figure 1A:
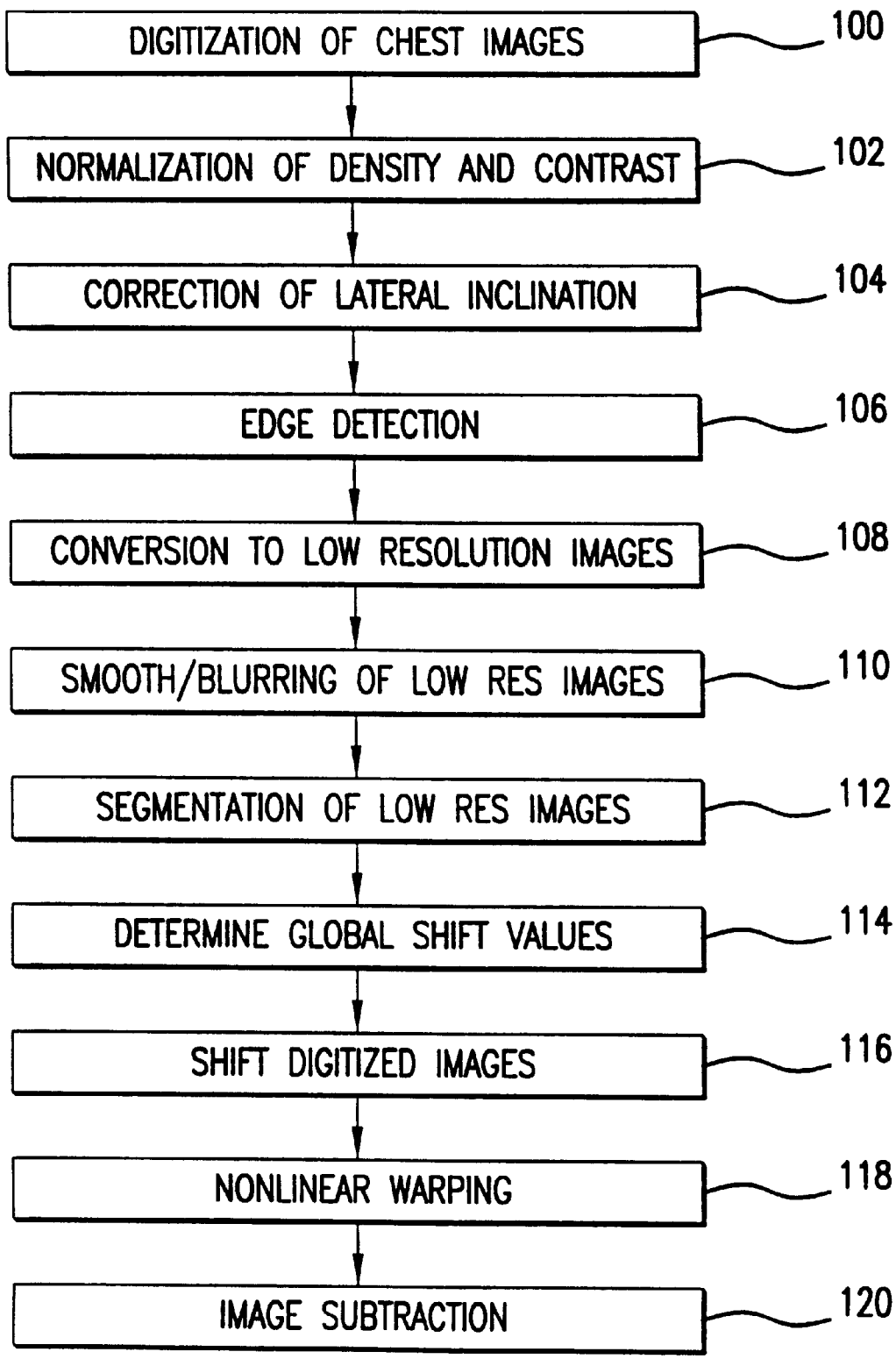
FIG. 1(a) is a flowchart of a method of detecting interval changes in chest radiographs utilizing temporal subtraction combined with automated initial image matching.

Referring now to the drawings, wherein like reference numerals designate identical or corresponding parts throughout the several views, and more particularly to FIG. 1(a) thereof, the operation of the improved temporal subtraction method, as illustrated in FIG. 1(a), begins at step 100 where chest radiographic images are digitized. The digitized images are of a current and a previous radiographic image, FIGS. 2(a) and 2(b), respectively, for example. The digitization of these images can be performed by scanning the image via a scanner or other digitizing device or by retrieving data directly from an image producing machine, such as a Fuji Computed Radiography (FCR) system, for example, see M. Sonoda, M. Takano, J. Miyahara, H. Kato, "Computed-radiography utilizing scanning stimulated luminescence," Radiology, 148, 833–838, (1983).

At step 102, the images are normalized with respect to density and contrast. If the images are produced by a similar method or the same system, normalization of density and contrast may not be required. However, any variances in how the digitized images are produced, such as differences in film type or differences in the digitization process for example, will require normalization.

Normalization of conventional screen/film produced images can be performed by employing a non-linear density correction technique using H and D curves for the screen/film system and a different set of lookup tables for each radiographic film. See H. Yoshimura, X. W. Xu, K. Doi, H. MacMahon, K. R. Hoffman, M. L. Giger, and S. M. Montner, "Development of a high quality film duplication system using a laser digitizer: Comparison with computed radiography," Med. Phys. 20, 179–186, (1993). Systems such as FCR maintain density and contrast of images via an exposure data recognition system. See H. Takeo, N. Nakajima, M. Ishida, H. Kato, "Improved automatic adjustment of density and contrast in FCR system using neural network," Proc. SPIE, 2163, 98–109, (1994). Therefore, normalization of density and contrast need not be applied when utilizing the FCR system for each of the current and previous radiographic images.

Figure 2A:
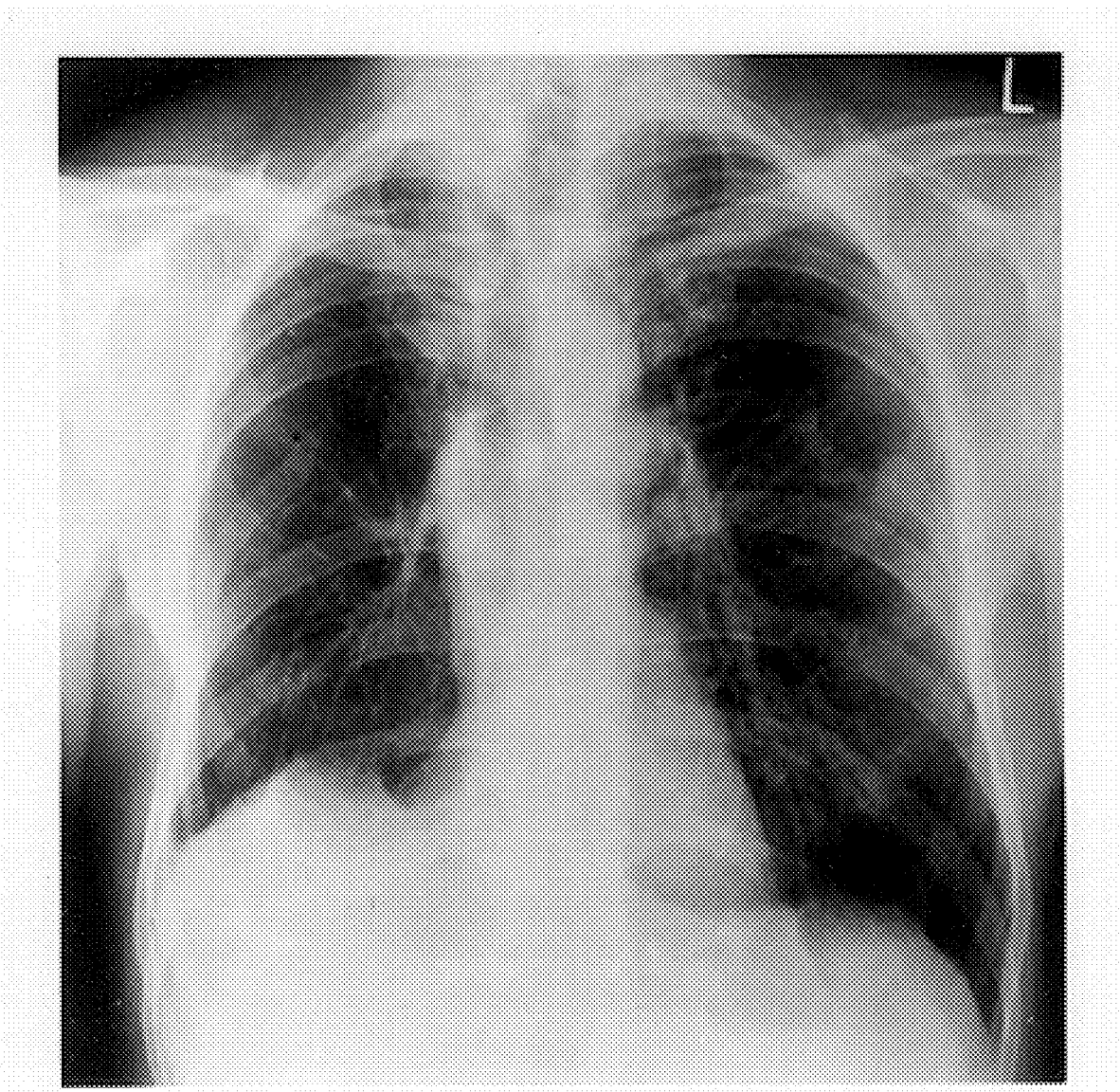
FIG. 2(a) is a current chest image taken with a Fuji-Computed Radiography (FCR) system.
Figure 2B:
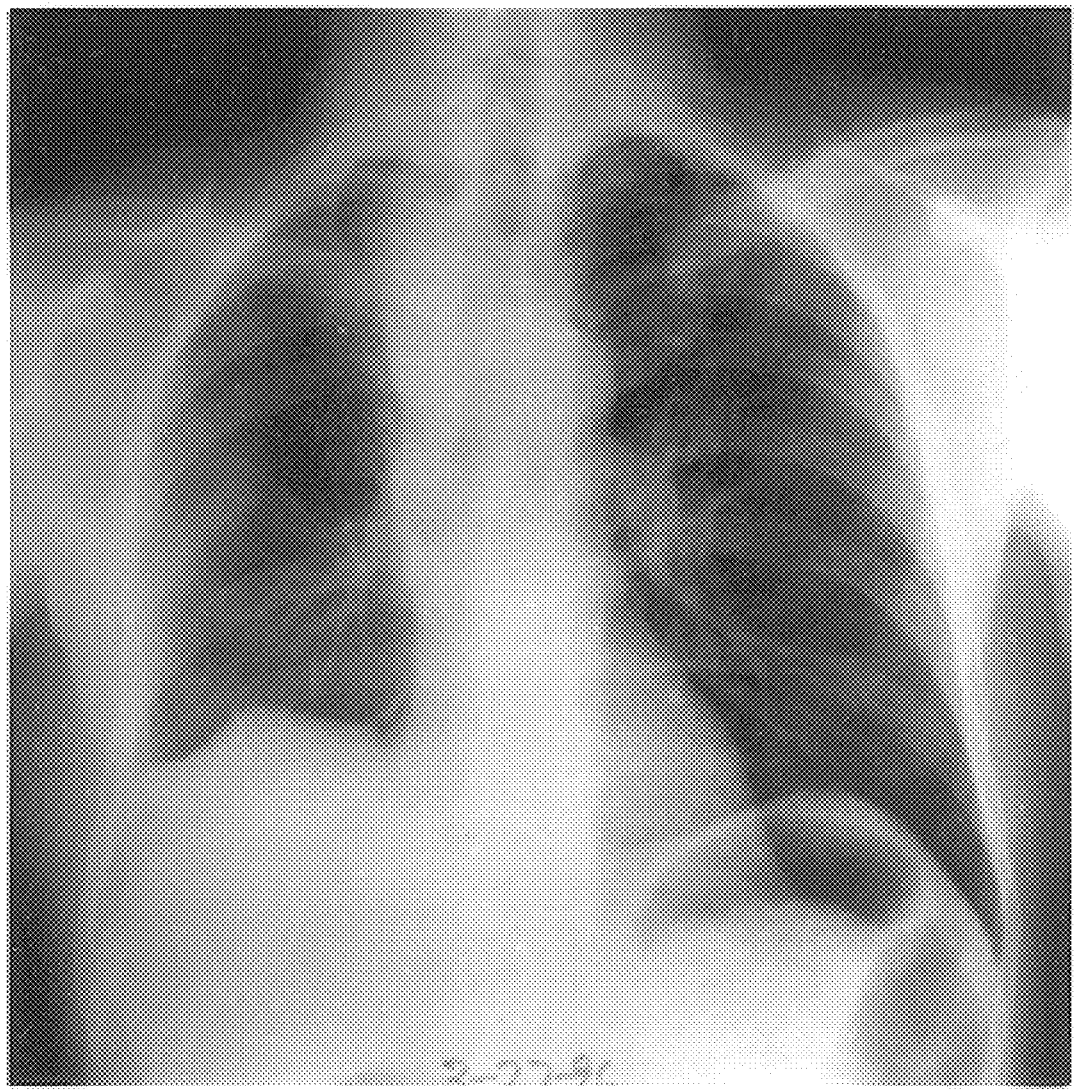
FIG. 2(b) is a previous chest image taken with a conventional screen/film system.

However, in this example, the current radiographic image, FIG. 2(a) was produced using the FCR system, and the previous radiographic image, FIG. 2(b), was produced via a conventional screen/film system. Therefore, normalization is required for the image FIG. 2(b).

At step 104, the digitized images are corrected for lateral inclination by image rotation. Lateral inclination is due to variations in patient positioning during exposure of the current and previous radiographic images. For correction, a midline is first determined in each image. The image, or images are then rotated an amount equal to an angle between the midlines to correct lateral inclination. See X. W. Xu, K. Doi, "Image feature analysis for computer-aided diagnosis: Accurate determination of ribcage boundary in chest radiographs," Med. Phys. 22: 617–626 (1995), hereinafter X. W. Xu et al.

At step 106, rib cage edges in the digitized images are detected. Rib cage edge detection can be performed by any edge detection method, such as image profile analysis, (See X. W. Xu et al.) for example.

In order to determine a global shift value, which corresponds to a shift in x, y coordinates of pixels of one image relative to another image, between the images, the present invention employs a new automated initial image matching technique based on a cross-correlation of low resolution images. Thus, at step 108, the digitized images are converted to a low resolution images by reduction to 128×128 matrices. The conversion is performed via averaging. Any method of averaging may be utilized. A 128×128 matrix size was chosen because it provides sufficient resolution for further processing and is a small enough that further processing can be performed within a reasonable amount of CPU time. It was found that image resolutions of less than 64×64 matrix sizes visibly distorted the shape of the lung in each image.

It is assumed that fine structures in the lungs, such as small vessels, bronchia, device wires, and catheters, for example, do not affect accuracy required for initial image matching. At step 110, smoothing, or blurring of the low resolution images is performed via a Gaussian filter, which removes fine structures in each image. A Gaussian filter having a 9×9 matrix size was used, however a 13×13 matrix was also tested yielding similar results. However, the quality of the temporal subtraction image was slightly degraded when 5×5 Gaussian filter was used for blurring of low resolution images. This may be because cross-correlation values become unreliable due to fine anatomical structures included in the chest images.

Specifically, the present inventors experimented using a smaller matrix size for the low resolution images utilized for automated initial image matching. Blurred low resolution images of 64×64 matrix size were used instead of 128×128 matrix size. A 5×5 Gaussian filter was used for blurring because of the smaller image size. Subtraction image quality became inferior to the subtraction image which was obtained with 128×128 images. Quality problems included a lung shape that was visibly distorted on the 64×64 images, thus resulting in an erroneous global shift value.

Figure 2C:
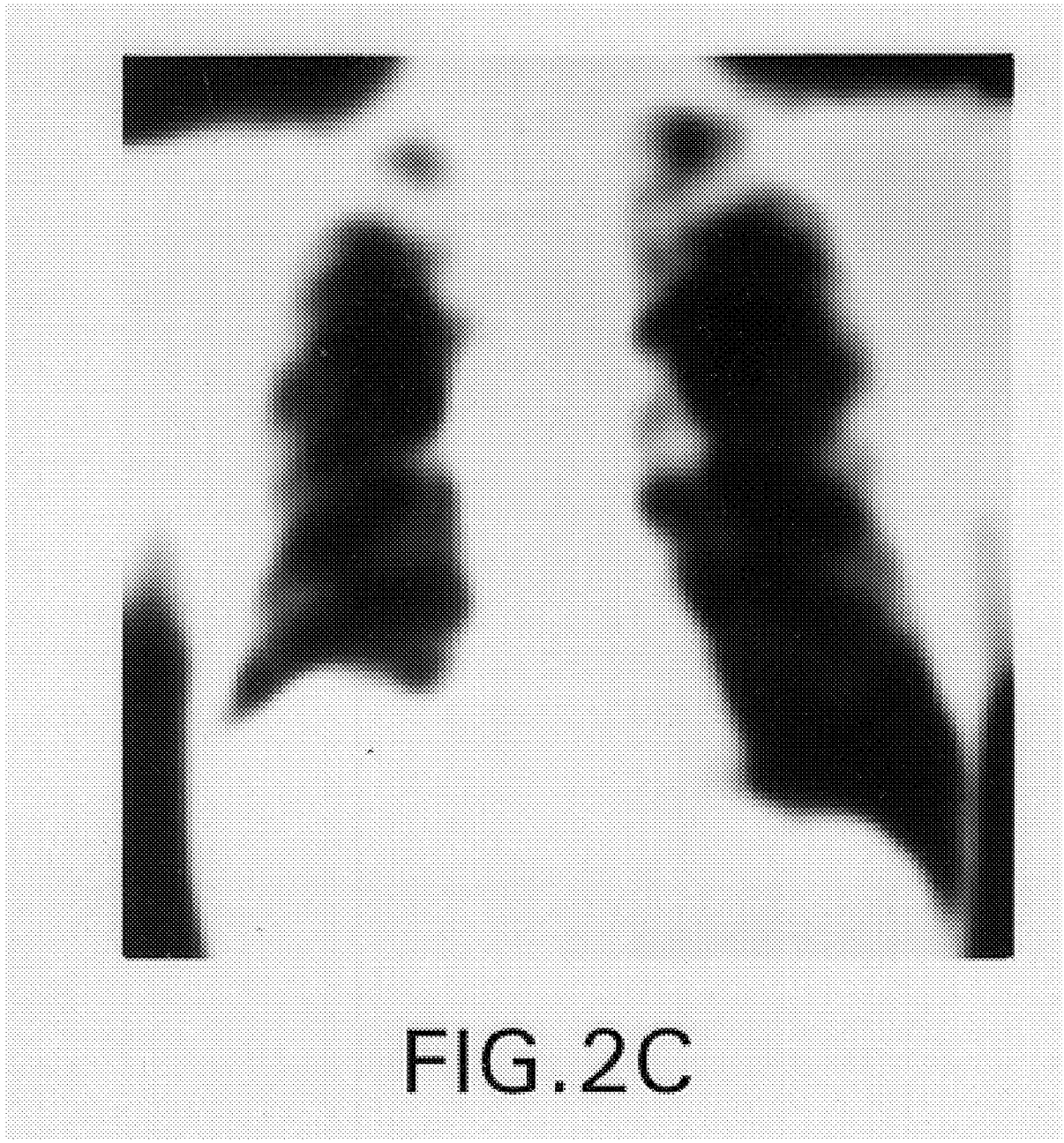
FIG. 2(c) is a low resolution image of FIG. 2(a) blurred with a Gaussian filter.
Figure 2D:
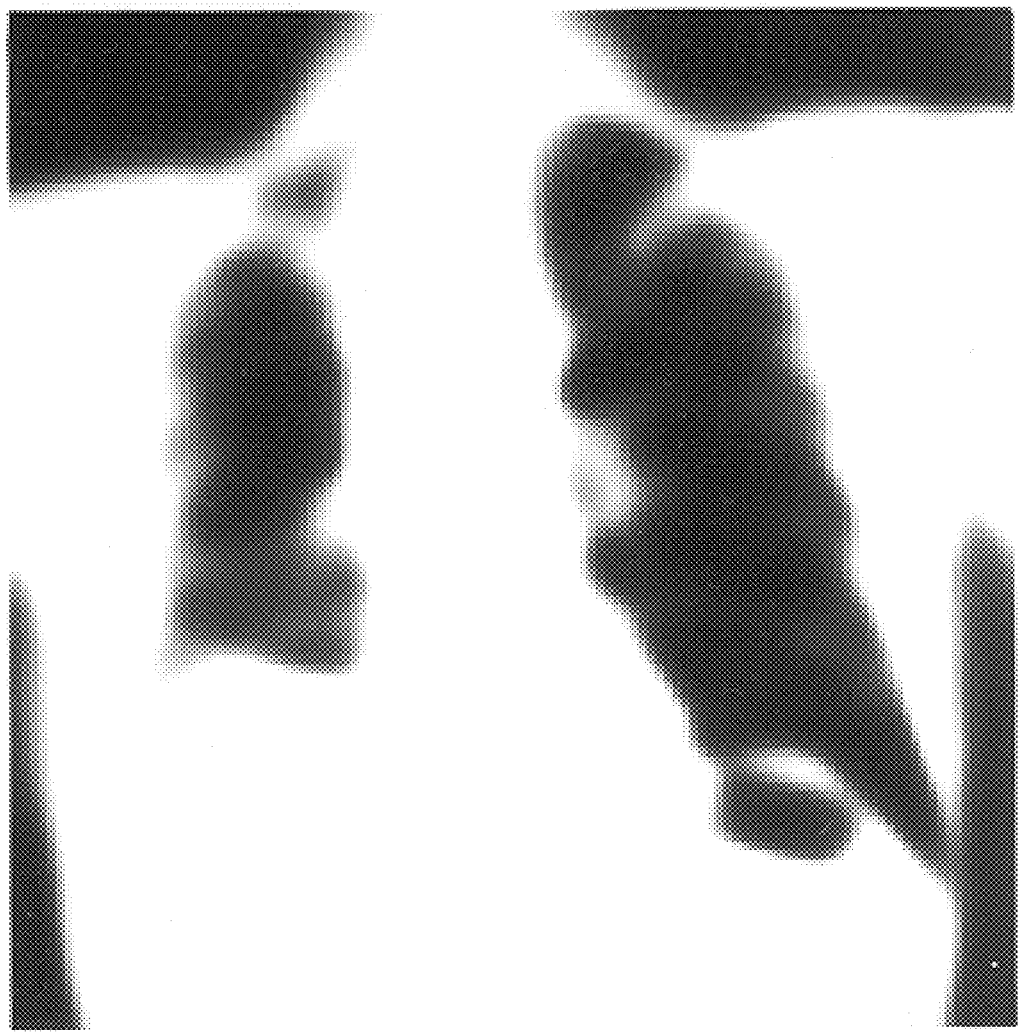
FIG. 2(d) is a low resolution image of FIG. 2(b) blurred with a Gaussian filter.

FIGS. 2(c) and 2(d) illustrate images FIGS. 2(a) and 2(b), respectively, after conversion to low resolution images (128×128 matrices) and blurring by a 9×9 Gaussian filter. FIGS. 2(c) and 2(d) are enlarged by a factor of four for clarity of illustration because they are in reduced size (reduction occurred when they were converted to low resolution images).

Figure 3A:
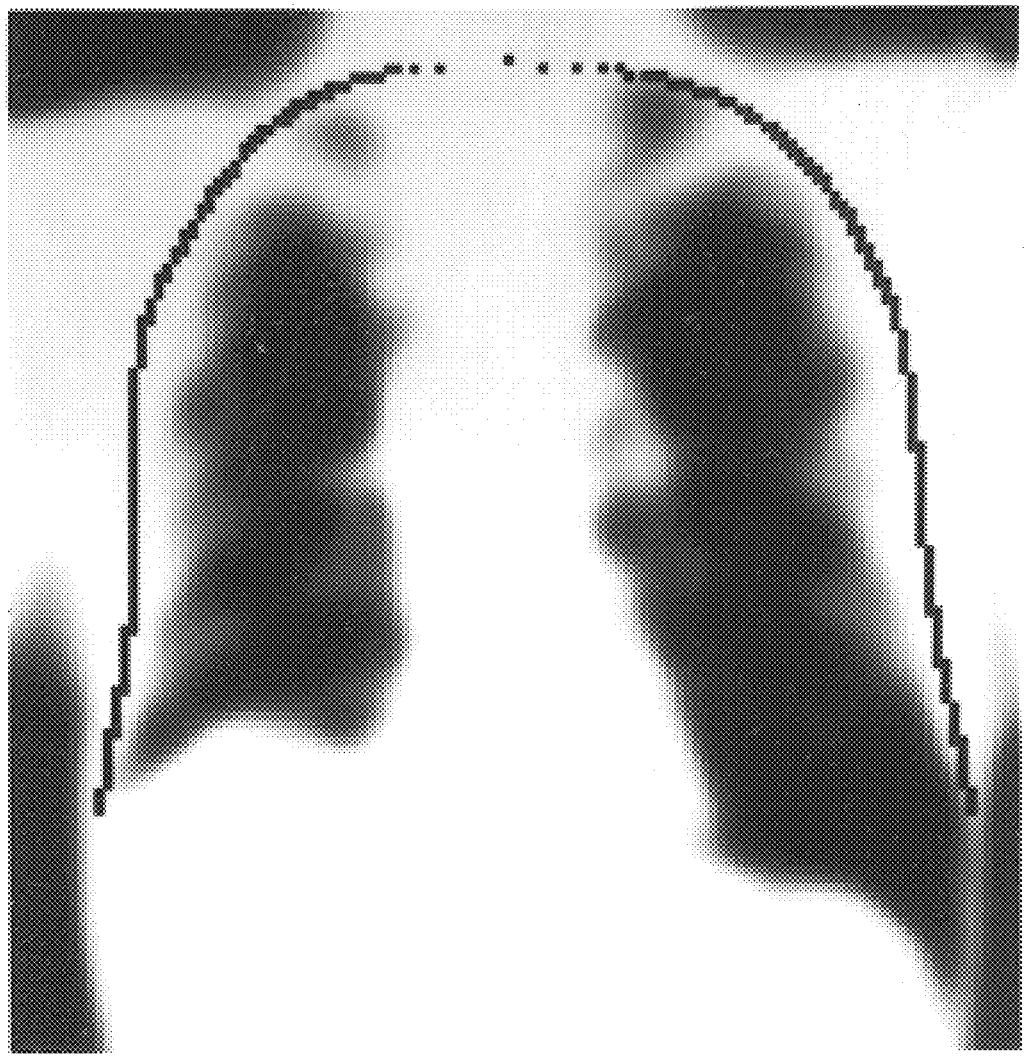
FIG. 3(a) is the blurred low resolution image of FIG. 2(c) with detected rib cage edges overlaid (black line)
Figure 3B:
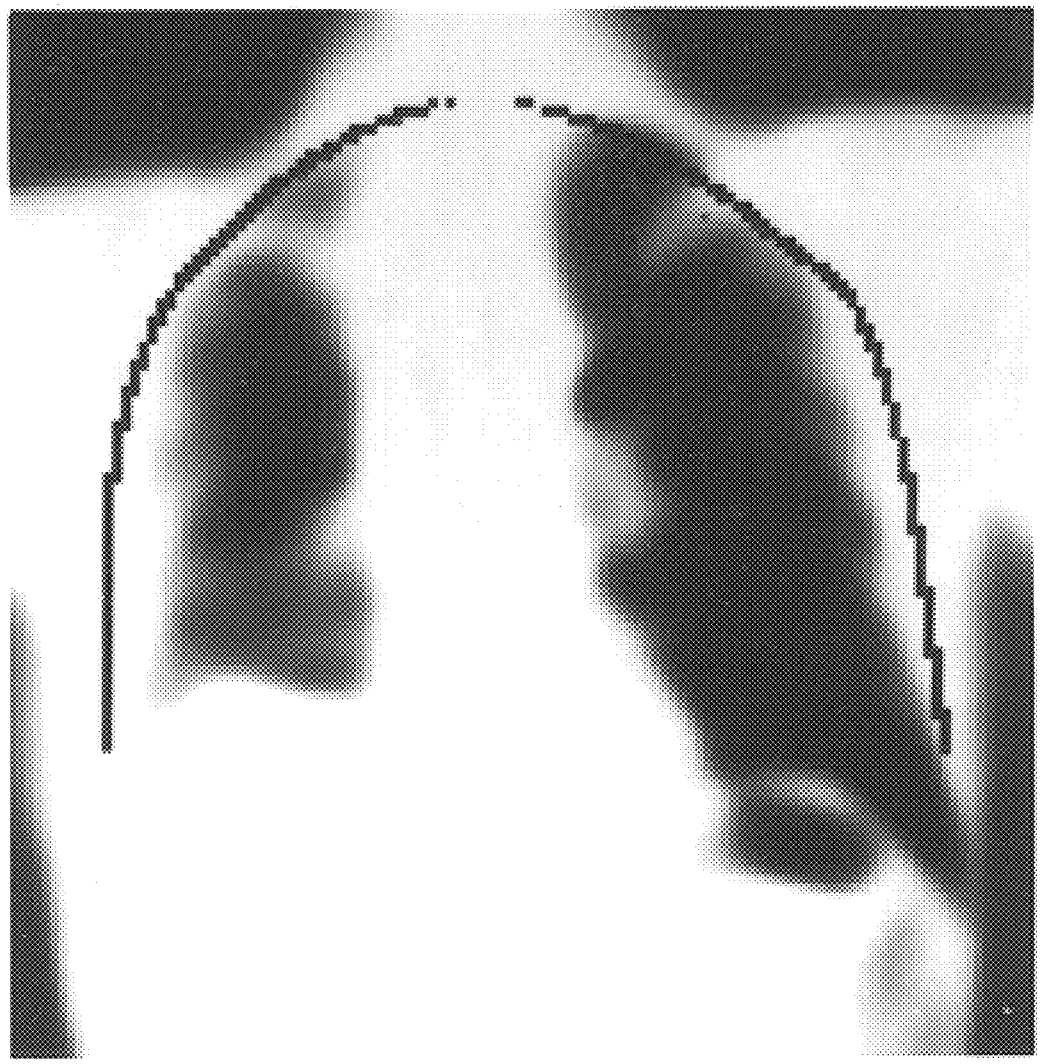
FIG. 3(b) is the blurred low resolution image of FIG. 2(d) with the detected rib cage edges (black line) overlaid.

At step 112, lungs, a feature of interest, are segmented from the low resolution images using the rib cage edges detected in step 106. FIGS. 3(a) and 3(b) respectively illustrate the low resolution images of FIGS. 2(c) and 2(d) with the detected rib cage edges overlaid.

Segmentation permits concentration of processing in an area of interest and in which reliable positioning most likely exists. Thus, areas outside the rib cage edges are ignored for calculation of the cross-correlation values between the current and previous images. In addition, the lower part of the lung of the previous image were not used for the initial image matching, because the position of the diaphragm in a chest image can be varied by the lung expansion and is thus unreliable for image matching. The detected rib cage edges of the current and previous images are demonstrated by dark lines 200 superimposed on the blurred low resolution images 3(a) and 3(b).

Figure 3C:
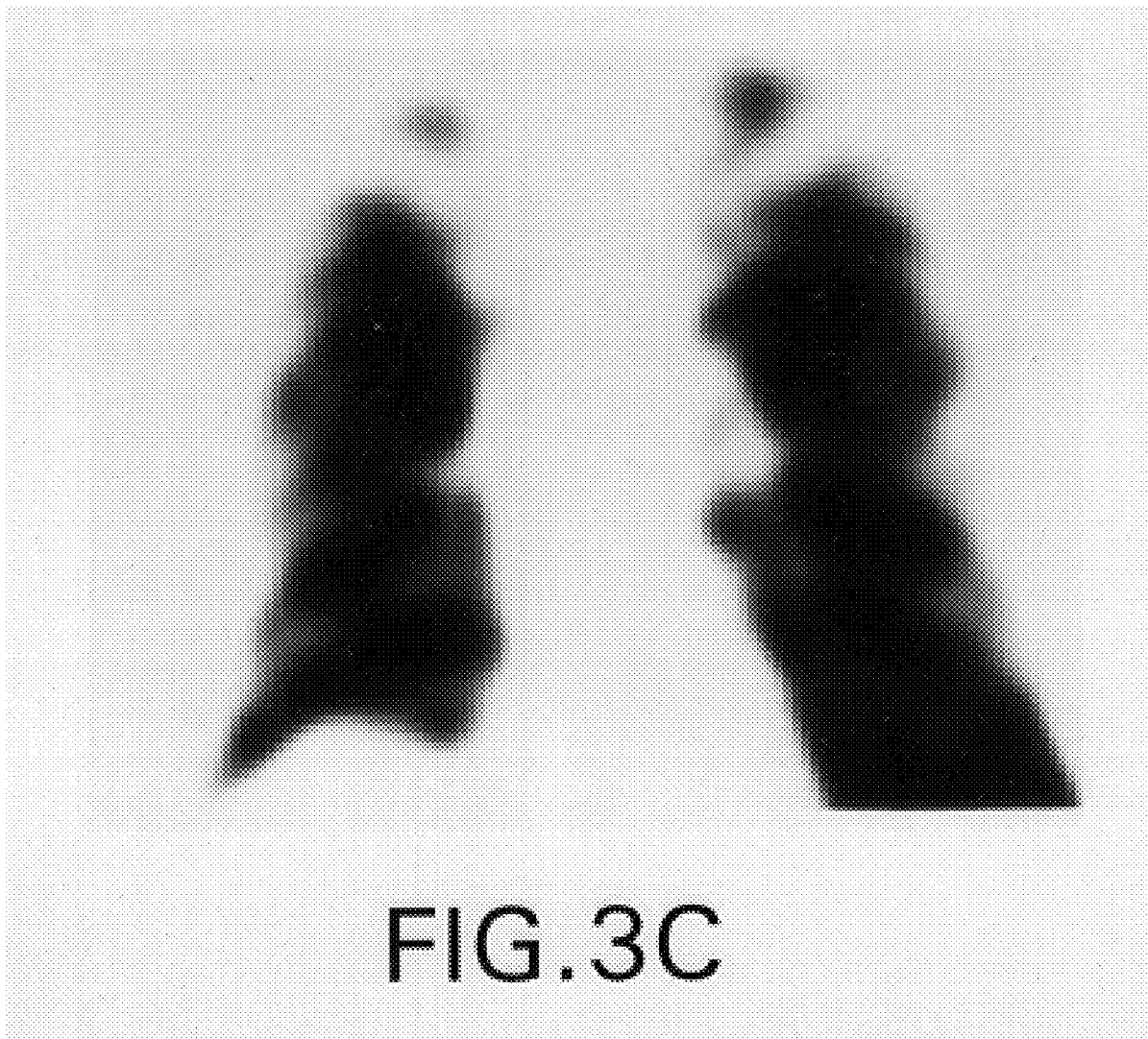
FIG. 3(c) is a lung image segmented from the blurred low resolution image of FIG. 2(c) to be utilized for automated initial image matching.
Figure 3D:
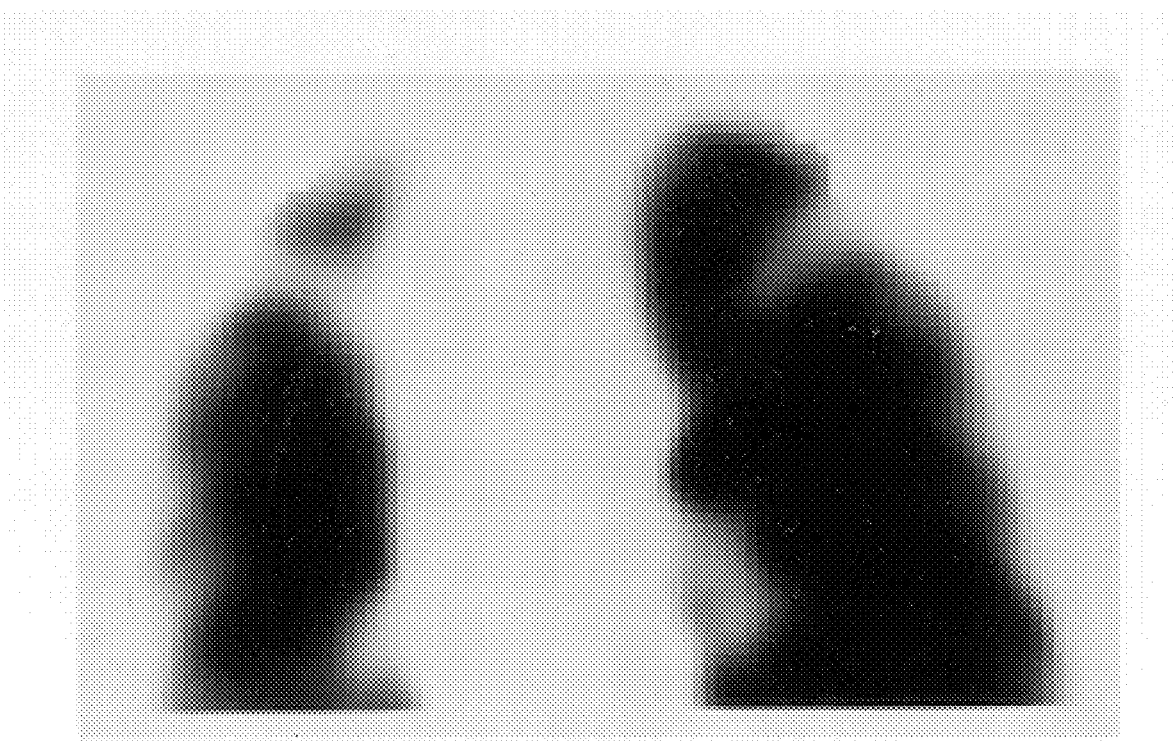
FIG. 3(d) is a lung image segmented from the blurred low resolution image of FIG. 2(d) to be utilized for automated initial image matching.

The images used for the initial image matching are shown in FIG. 3(c) and (d). The matrix size of the segmented blurred previous image of FIG. 3(d) is 100(H)×60(V). Using this segmented blurred previous image, cross-correlation values were obtained to determine a best matching location between the two images in FIG. 3(c) and (d).

Figure 1B:
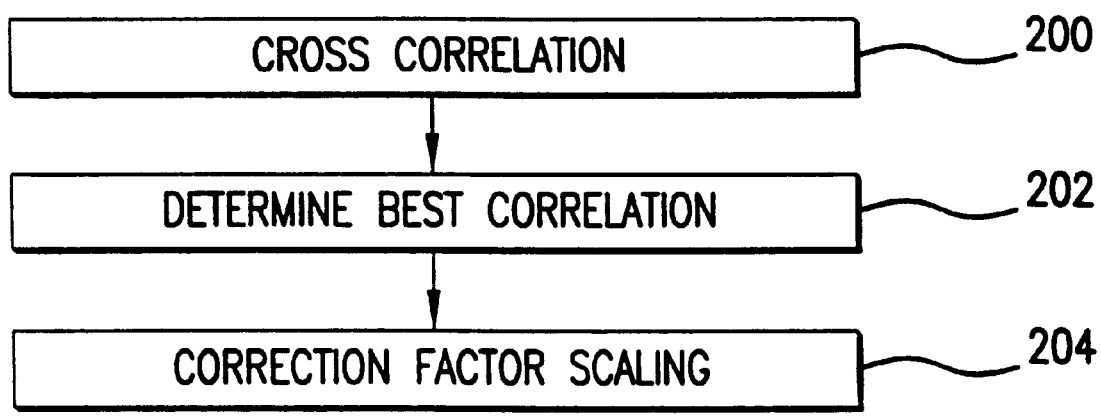
FIG. 1(b) is a flow chart illustrating determination of a global shift value.

At step 114, a global shift value is calculated. The global shift value is calculated as illustrated in FIG. 1(b). At step 200, cross-correlation values are calculated between the segmented blurred low resolution image matrices for plural x,y shifts of one image relative to the other. A cross correlation value is an averaged pixel-by-pixel product of the two images representing how well the two images are matched after an x,y shift.

Figure 4:
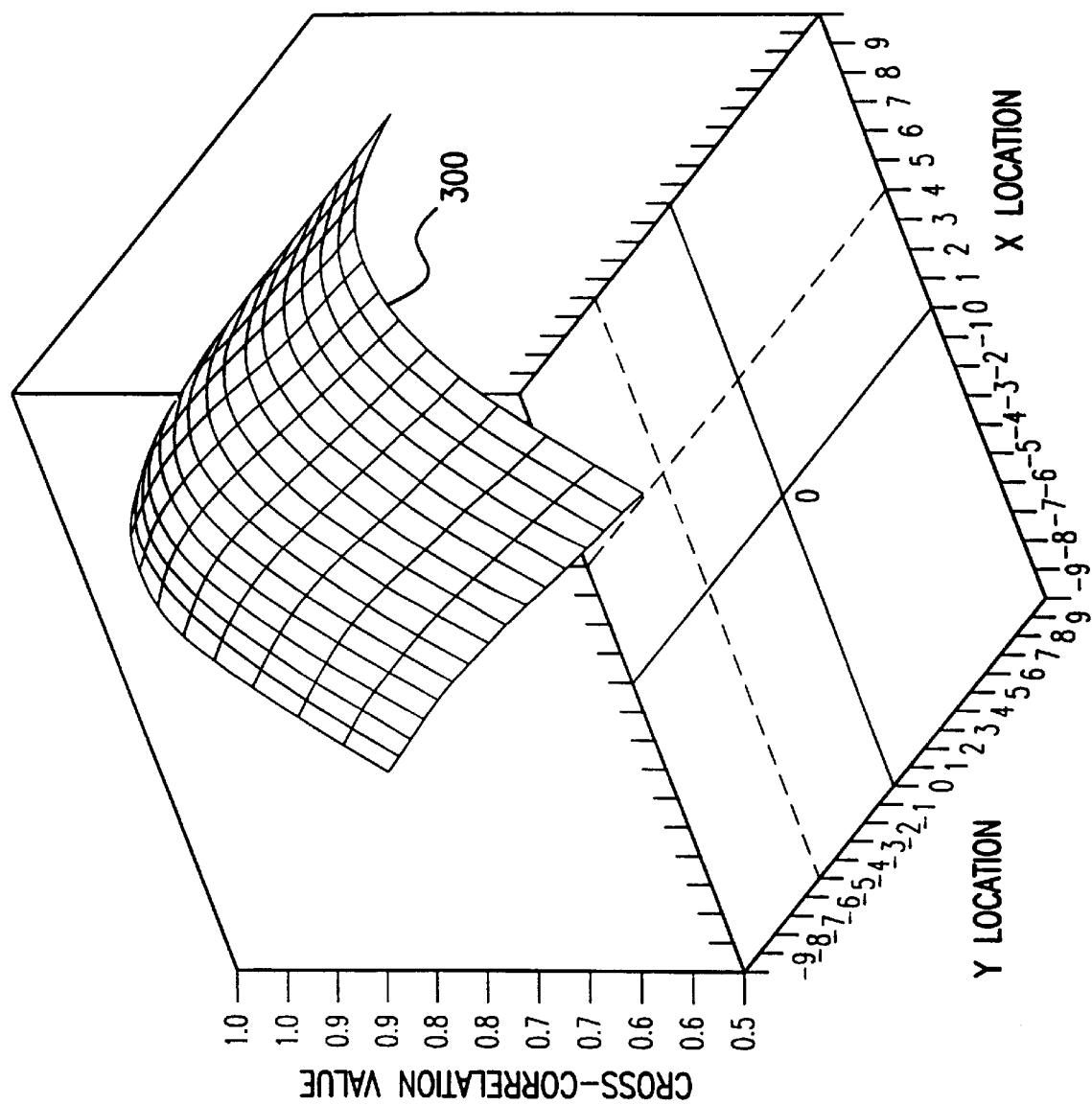
FIG. 4 is a three-dimensional graph illustrating cross-correlation values obtained from an automated initial image matching scheme.

FIG. 4 is an example of a three-dimensional graph 300 plotting cross-correlation values calculated for plural x,y shifts of one image with respect to the other of FIGS. 3(c) and 3(d) on an x, y, cross-correlation value coordinate system. A best correlation match, corresponding to properly matched or overlapped images, is represented by a maximum on the graph 300.

At step 202, a maximum cross-correlation value is determined and considered to be the best correlation match. In the example illustrated in FIG. 4, the best correlation match was determined to be a shift of four pixels right and five pixels up from the crossing point of the midline with the top of the lungs in the previous chest image.

Further, at step 204, x,y coordinates of the best correlation match are scaled by a correction factor based on the reduction in image size that occurred when the digitized images were converted to low resolution. The scaled x,y coordinates represents a global shift value between the digitized images prior to low resolution conversion. By shifting the images relative to each other according to the global shift value, an initial image match results.

Continuing now with FIG. 1(a), at step 118, a non-linear geometric image warping technique is performed to provide further matching an image registration of the two images. Non-linear geometric image warping is described in detail in the previous work (see A. Kano et al.), and comprises the steps of selecting a number of regions of interest (ROIs) in each image, performing local matching between matching pairs of ROIs, mapping shift values between the locally matched ROIs, applying a curve fitting technique to the mapped shift values, and non-linear warping one of the two images based on results of the curve fitting technique (the immediately preceding steps corresponding to steps 41–46 of U.S. Pat. No. 5,359,513). The present invention performs non-linear warping based on local matching of ROIs, which are offset by the global shift value determined in step 114.

For example, in the previous work, ROI's in each image are selected relative to common reference points (an intersection of a midline of the image with a top of the lungs, for example) independently determined in each image. A template ROI is selected in one image, and a corresponding search ROI is selected in the other image based on the common reference points independently determined in each image. In the method according to the present invention, template ROI's are selected in one image, corresponding search area ROI's are selected in the other image, and a corresponding center of each search area ROI is shifted by the global shift value. Other methods or variations that take into account the global shift value may be substituted for the above, including shifting one image relative to the second image according to the global shift value prior to non-linear warping and then selecting ROI's according to a common reference point that is therefore already shifted according to the global shift value.

Other methods or variations of the above may be substituted for or applied in addition to the above non-linear warping technique. Finally, at step 120, image subtraction is performed on the matched digital images.

Figure 5A:
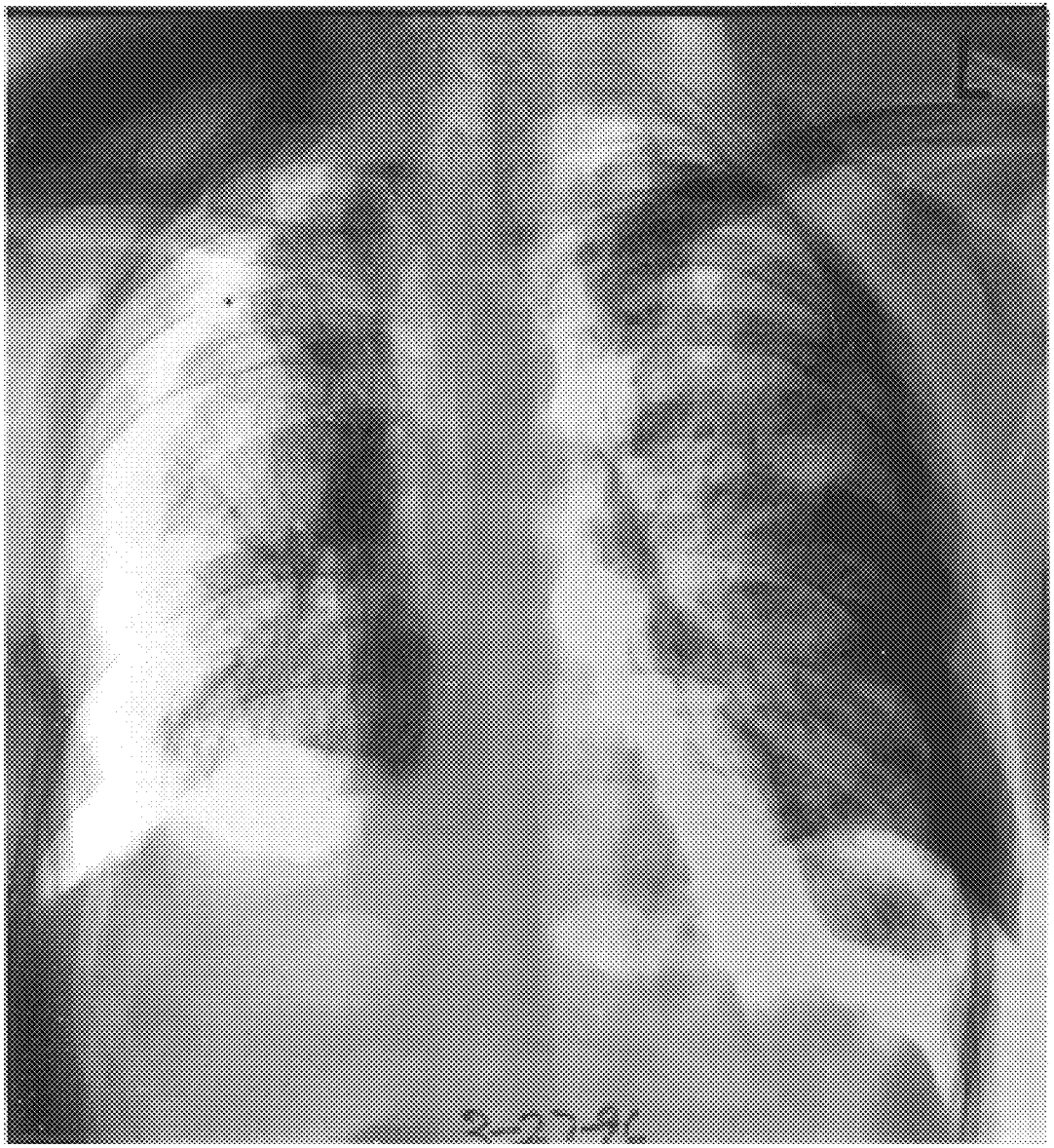
FIG. 5(a) is prior art illustrating a subtraction image obtained by a known temporal subtraction between the current chest image of FIG. 2(a) and the previous chest image of FIG. 2(b) without warping.
Figure 5B:
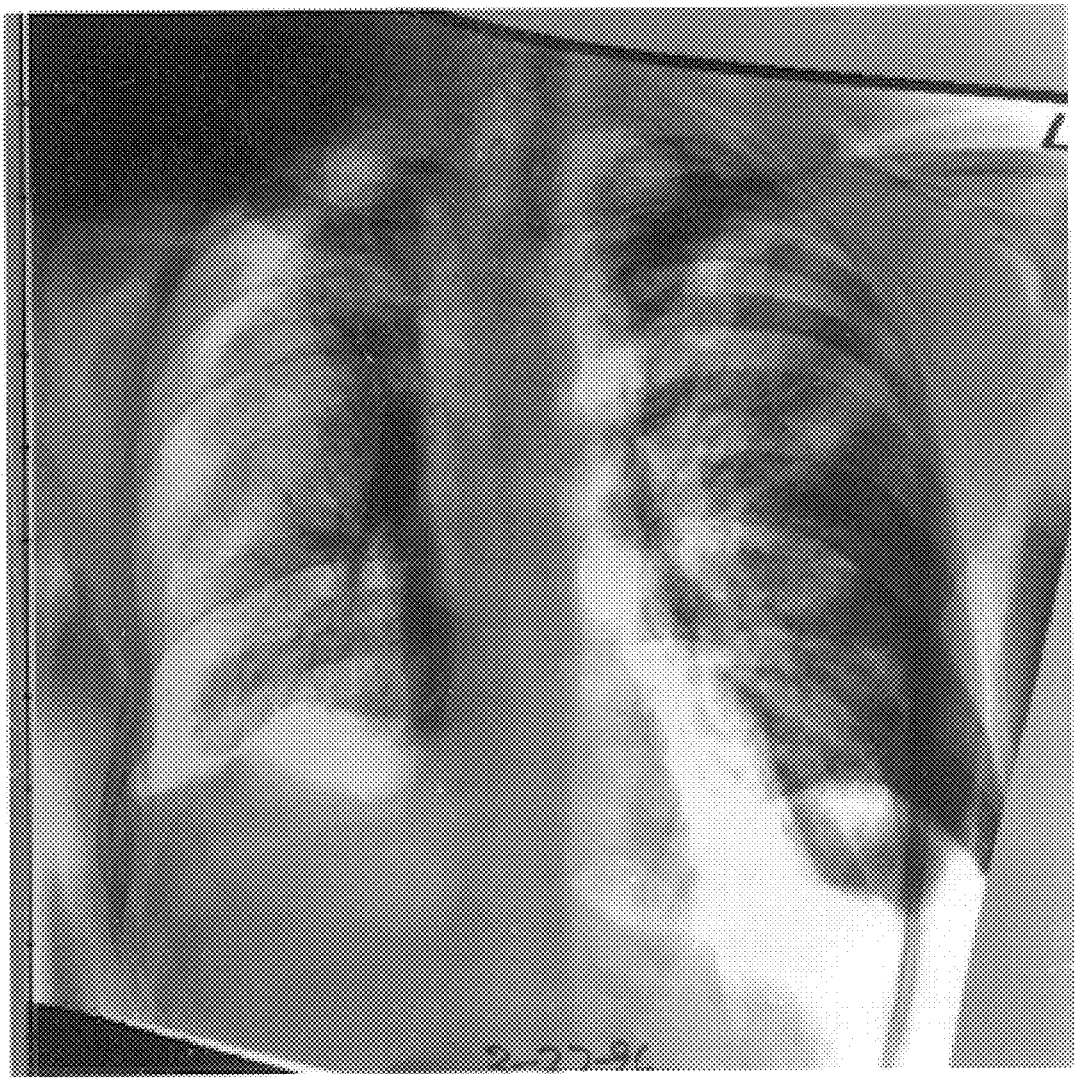
FIG. 5(b) is prior art illustrating a subtraction image obtained by a temporal subtraction between the current chest image of FIG. 2(a) and the previous chest image of FIG. 2(b) with warping.

FIGS. 5(a), 5(b), 5(c), and 5(d) are from a clinical case that illustrates follow-up from a lung cancer operation. FIGS. 5(a) and 5(b) each illustrate poor quality subtraction images resulting from severe misregistration error. In FIG. 5(a), a warping technique was utilized, and FIG. 5(b) was produced without image warping.

Figure 5C:
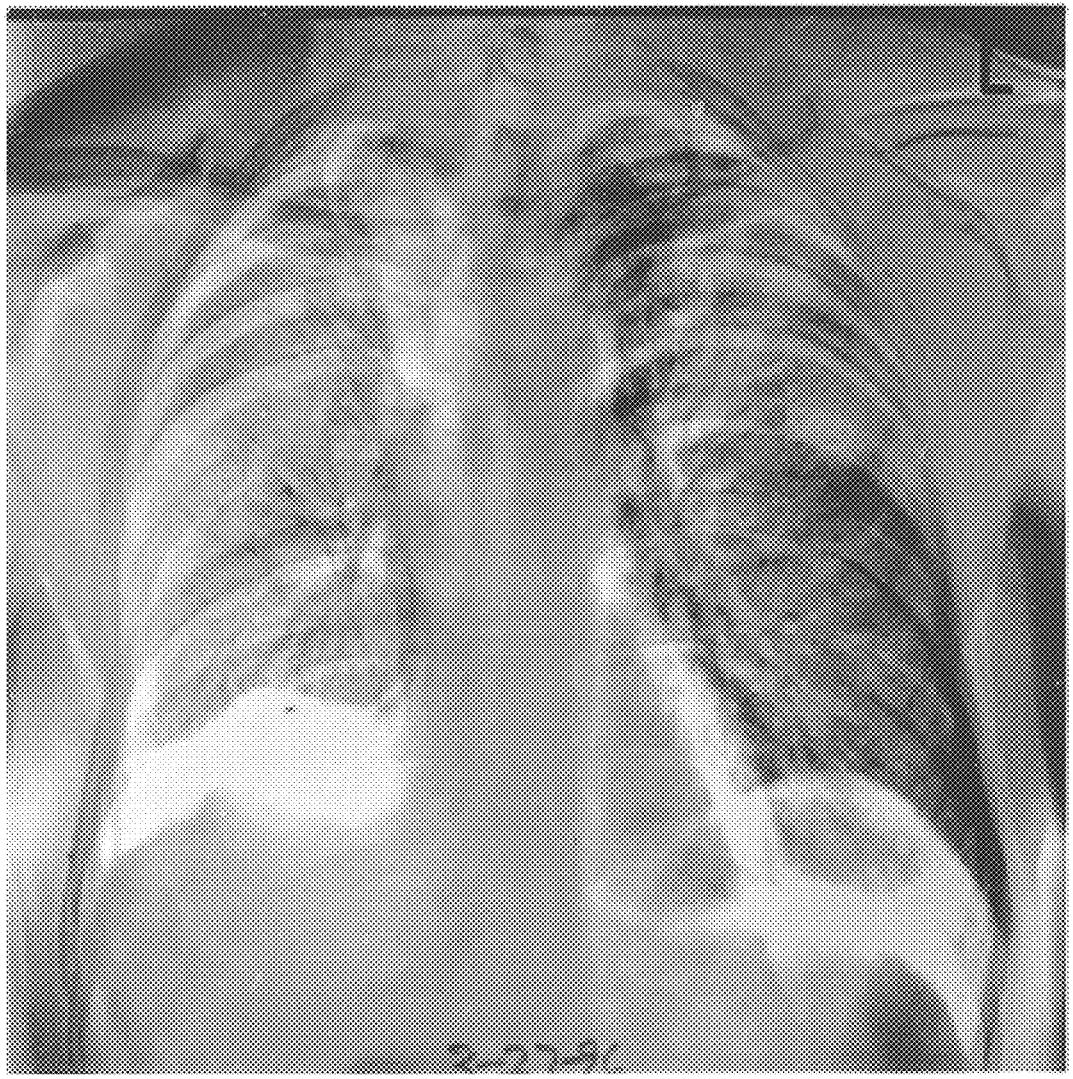
FIG. 5(c) is a subtraction image obtained by temporal subtraction between the current chest image of FIG. 2(a) and previous chest image of FIG. 2(b) utilizing automated initial image matching according to the present invention without warping.
Figure 5D:
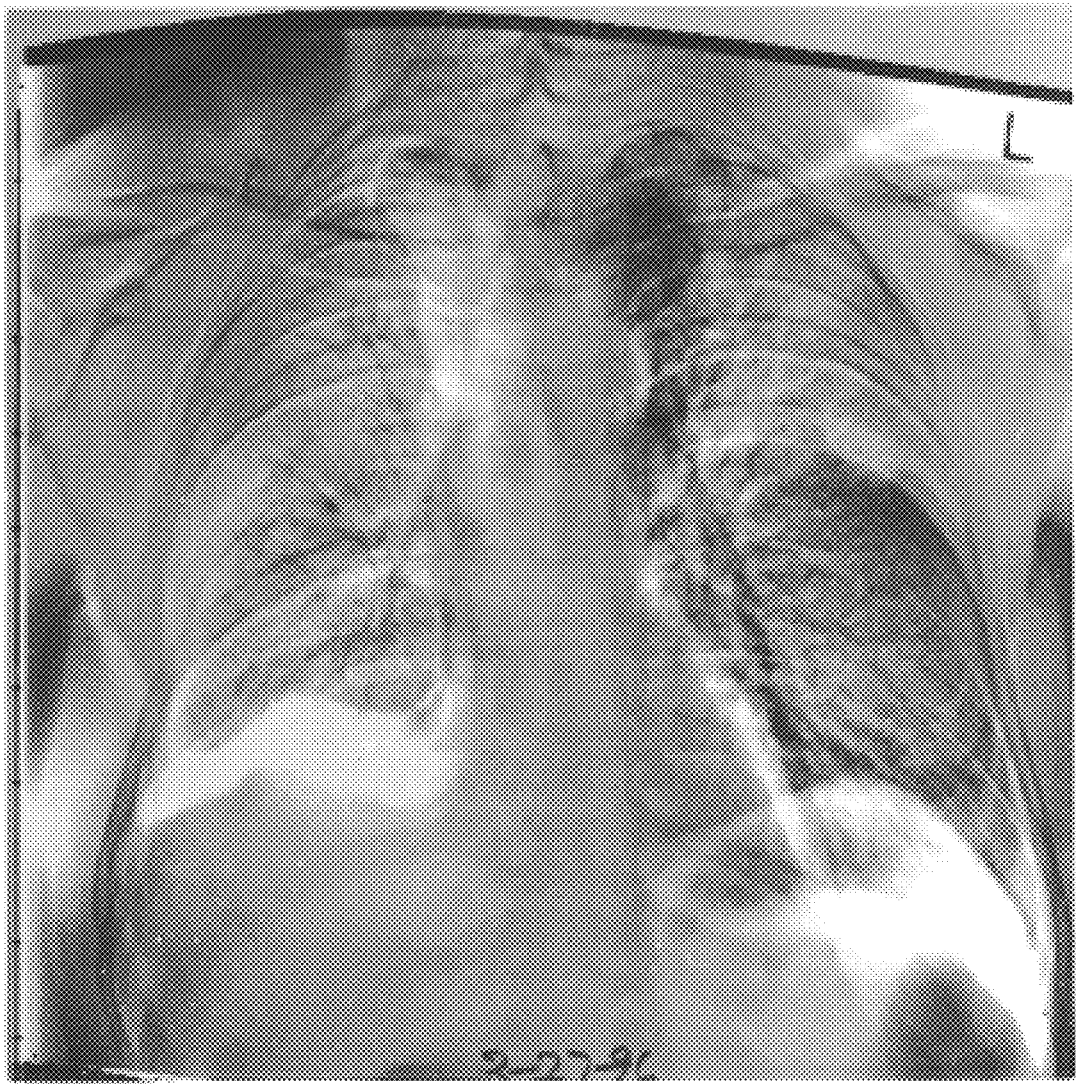
FIG. 5(d) is a subtraction image obtained by temporal subtraction between the current chest image of FIG. 2(a) and previous chest image of FIG. 2(b) utilizing automated initial image matching according to the present invention with warping.

FIGS. 5(c) and 5(d) illustrate subtraction images from the same case as FIGS. 5(a) and 5(b), however, the initial image matching technique of the present invention is applied, FIG. 5(c) with warping, and FIG. 5(d) without warping. Improved clarity of interval changes is seen at an upper left and upper right of the lung fields. There is faint white shadow around a right edge of a third thoracic vertebrae indicating a size of a hematoma that existed in the previous chest radiograph decreased in the current image. Also, there is a dark shadow on an upper right (close to a left edge of the third thoracic vertebrae) showing a parenchyma fibrosis due to secondary changes as a result of the surgical operation in the present case, recognized in the current chest image. Comparison of FIGS. 5(a) and 5(b) with FIGS. 5(c) and 5(d), indicates that the new initial image matching technique of the present invention improves image registration and the resulting quality of temporal subtraction images.

Figure 6:
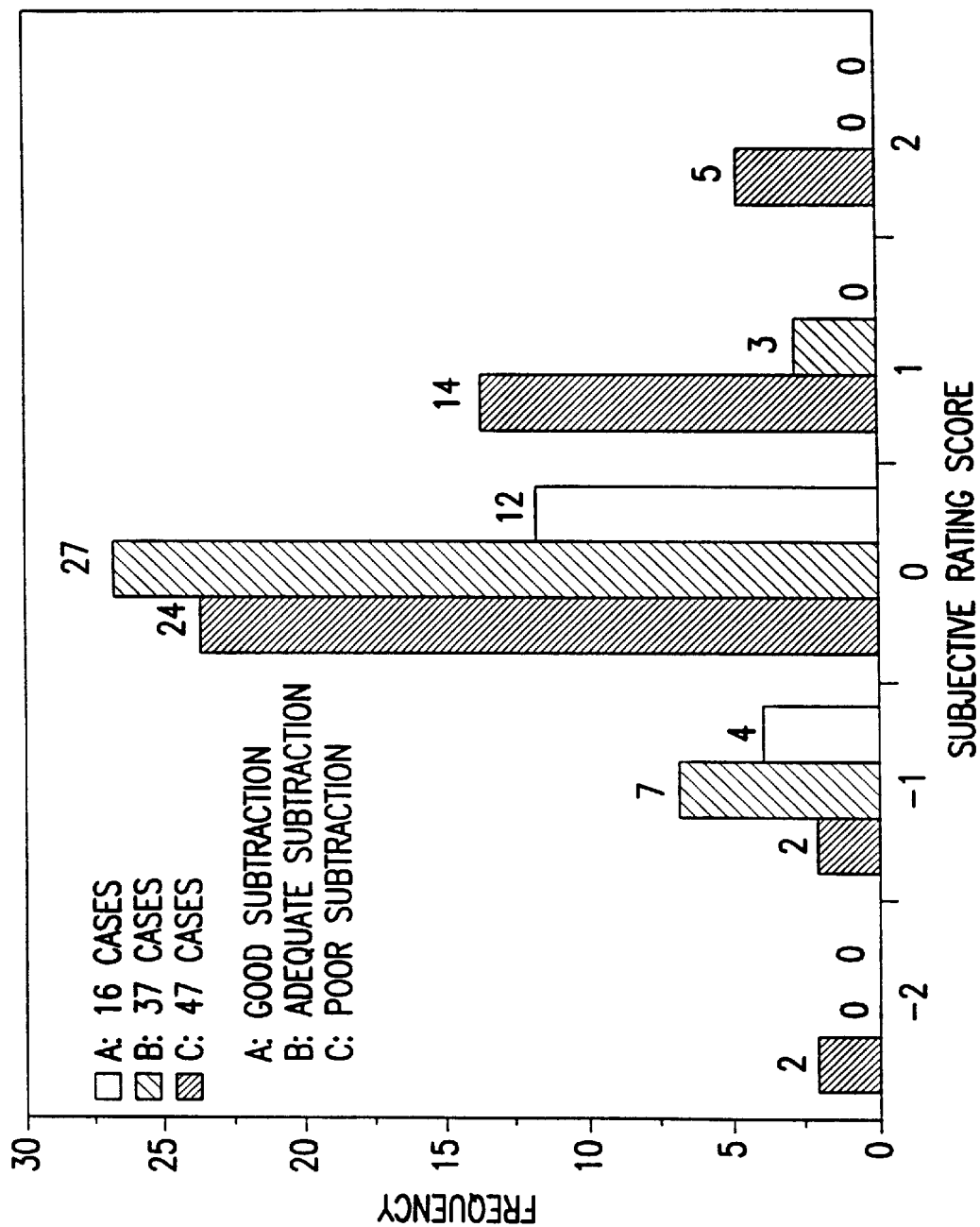
FIG. 6 is a chart illustrating the result of subjective ratings for subtraction images obtained according to the present invention relative to subtraction images obtained by to a previous temporal subtraction scheme.

FIG. 6 is a chart illustrating an objective evaluation of subtraction images determined according to the present invention relative to subtraction images obtained by the previous temporal subtraction scheme. 100 temporal subtraction images obtained by the previous temporal subtraction scheme are evaluated, a good subtraction image was obtained in 16 cases, adequate subtraction images were obtained 37 cases, and poor subtraction images were obtained in 47 cases. Images were then obtained utilizing the present invention.

The present inventors obtained 100 temporal subtraction images based on the new initial image matching technique of the present invention. These images were categorized into five categories using a subjective rating scale by independent observers (two chest radiologists and one physicist). A rating scale of +2 to −2 representing clinical usefulness of the images was employed. A rating of +2 was given if the quality of the subtraction image was clearly improved for clinical usefulness, +1 if the quality was moderately improved, 0 if unchanged. A rating of −1 was given if the quality of the subtraction image moderately declined for clinical usefulness, and −2 if the quality of the subtraction image declined for clinical usefulness. The final rating for each of the images was determined by an average of ratings from each observer.

As shown in FIG. 6, many of the subtraction images obtained by the present invention were unchanged in terms of the quality for clinical usefulness. However, FIG. 6 also clearly shows that 19 cases (40.4%) out of 47 cases which had originally resulted in poor quality subtraction images, were improved by applying the present invention.

During testing, the present inventors utilized an image database including images obtained by three different combinations of two different image recording systems, including a screen/film system (S/F) and an FCR system. As described above, if subtraction images are obtained from different imaging systems, good quality subtraction images may be difficult to obtain because of differences in quality of the images obtained from the different systems. For example, image quality of the FCR system is usually quite different from a screen/film system due to an unsharp masking technique utilized in FCR images, for example.

The present inventors also compared a number of subtraction images utilizing the previous temporal subtraction scheme from the three combinations of two different imaging systems, (i.e., screen/film vs. screen/film, screen/film vs. iFCR, and FCR vs. FCR). The compared images were categorized in three groups A, Good, B, Adequate, and C, Poor, as shown in Table 1.

TABLE 1

|  | Number of Cases | A | B | C |
| --- | --- | --- | --- | --- |
| S/F vs S/F | 50 | 8 (16%) | 18 (36%) | 24 (48%) |
| CR vs S/F | 43 | 6 (14%) | 17 (40%) | 20 (46%) |
| CR vs CR | 7 | 2 (29%) | 2 (29%) | 3 (42%) |

The percentages (42, 46, and 48%) of the poor subtraction cases (C cases) in each of the three combinations are similar. This result indicates that a temporal subtraction scheme utilizing the present invention does not depend on the image recording system used.

Reasons why 47 of the 100 cases resulted in a poor classification (C cases) are shown by category in Table 2.

TABLE 2

| CATEGORY | NUMBER OF CASES |
|---|---|
| A-P inclination: | 26 |
| Mismatch of image contrast: | 21 |
| Incorrect rib cage edge: | 19 |
| Lateral shift: | 3 |

Also made was a comparison of temporal subtraction images utilizing a manual initial image matching technique. In the manual initial image matching technique, a chest radiologist determines a rotation angle for correction of lateral inclination and a global shift value that includes a horizontal shift (x) and a vertical shift (y) to properly match a current and previous chest image. Thus, each parameter for the initial image matching is determined manually and "ideal" subtraction images can then be obtained.

Figure 7A:
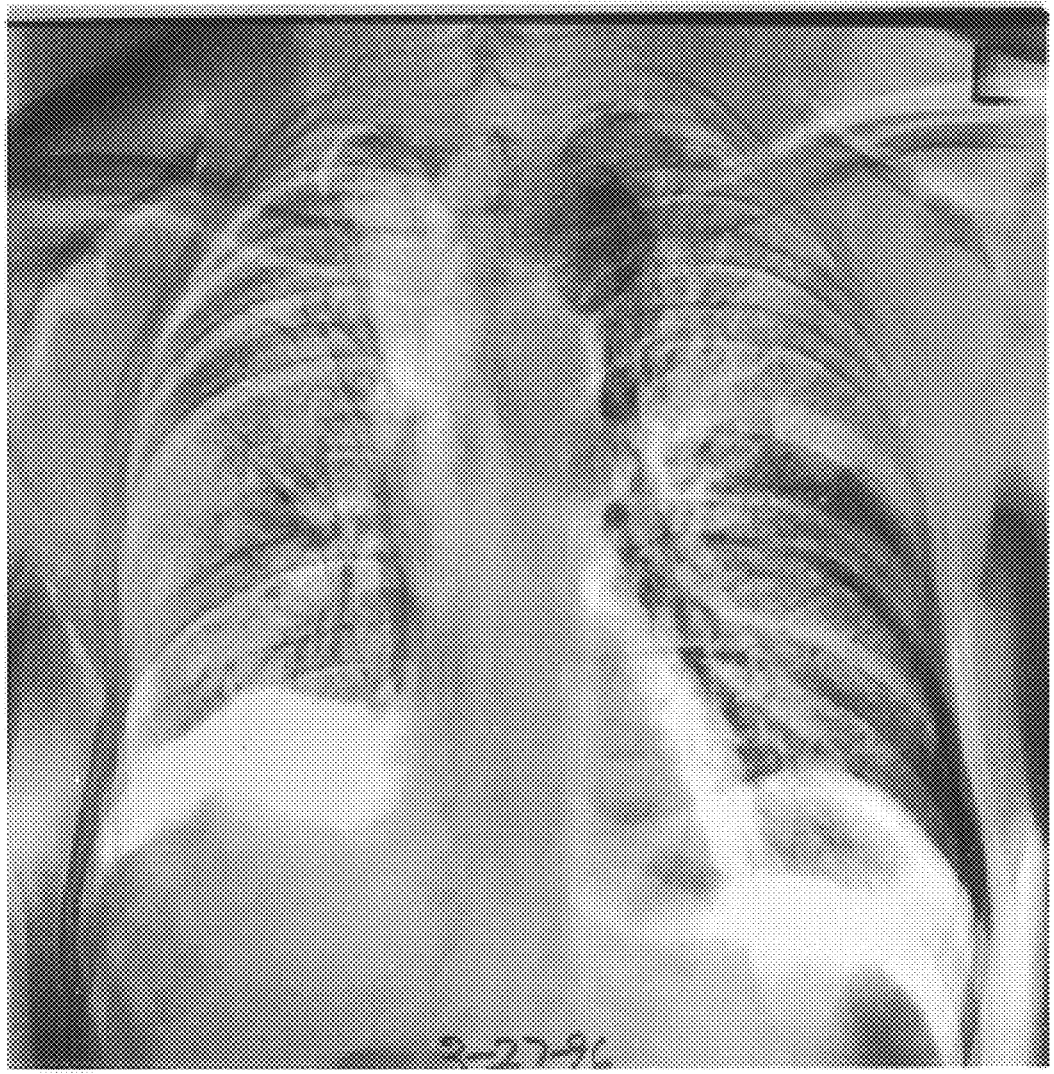
FIG. 7(a) illustrates a subtraction image obtained between the current chest image and the previous chest image without warping by the previous temporal subtraction scheme and using manual initial image matching.
Figure 7B:
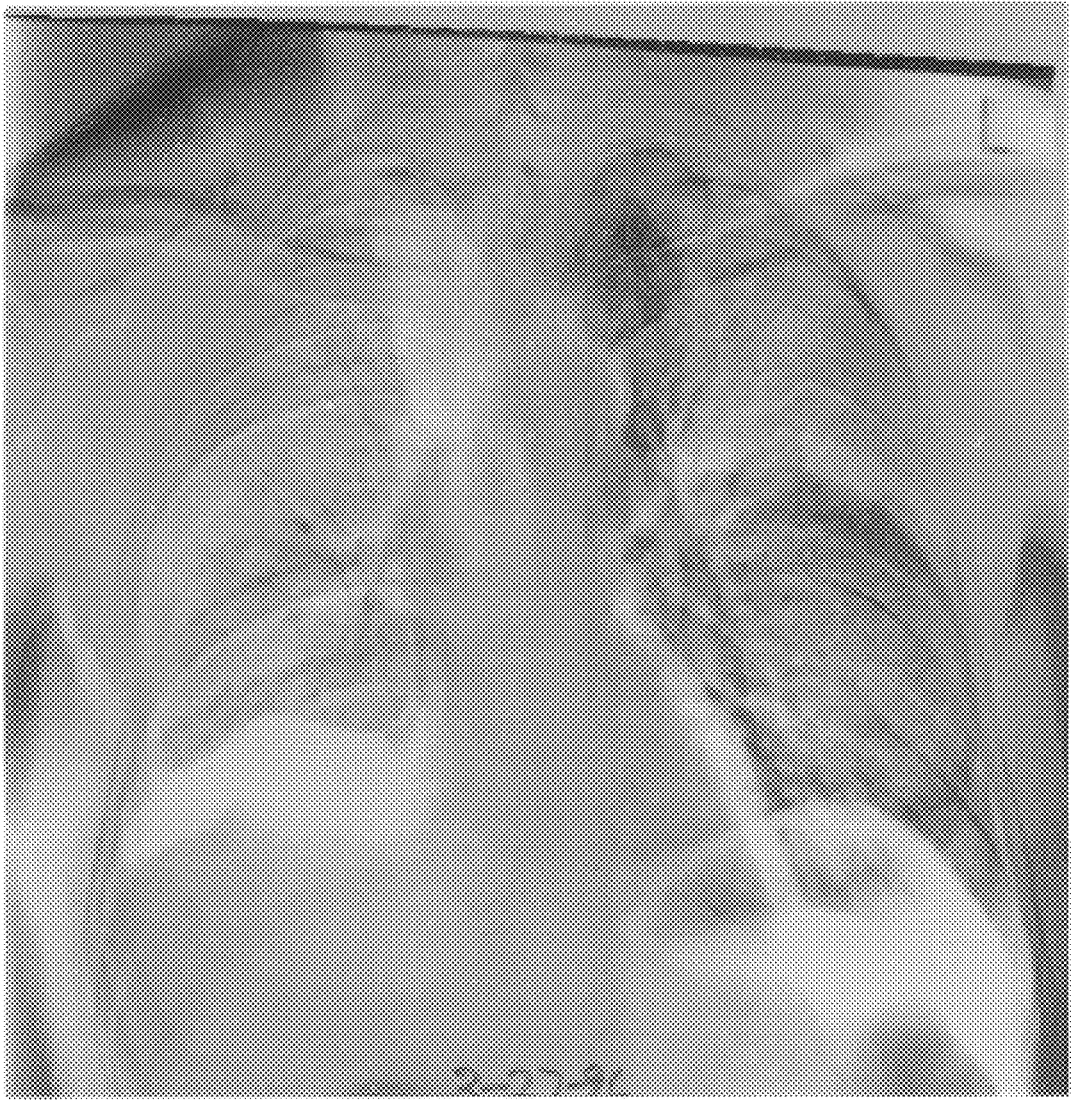
FIG. 7(b) is a subtraction image with warping obtained by the previous temporal subtraction scheme using manual initial image matching.

FIG. 7(a) and 7(b) show the resulting subtraction images obtained by manual initial image matching without and with warping, respectively. The quality of the subtraction images by manual initial image matching without warping is slightly better than the subtraction image by automated initial image matching of the present invention without warping (please compare FIGS. 7(a) and 5(c)). However, the quality of subtraction images obtained by automated initial image matching with warping is comparable to the "ideal" subtraction images obtained by manual initial image matching with warping (please compare FIGS. 7(b) and 5(d)). In six other cases evaluated, results as described above were similar.

Figure 1C:
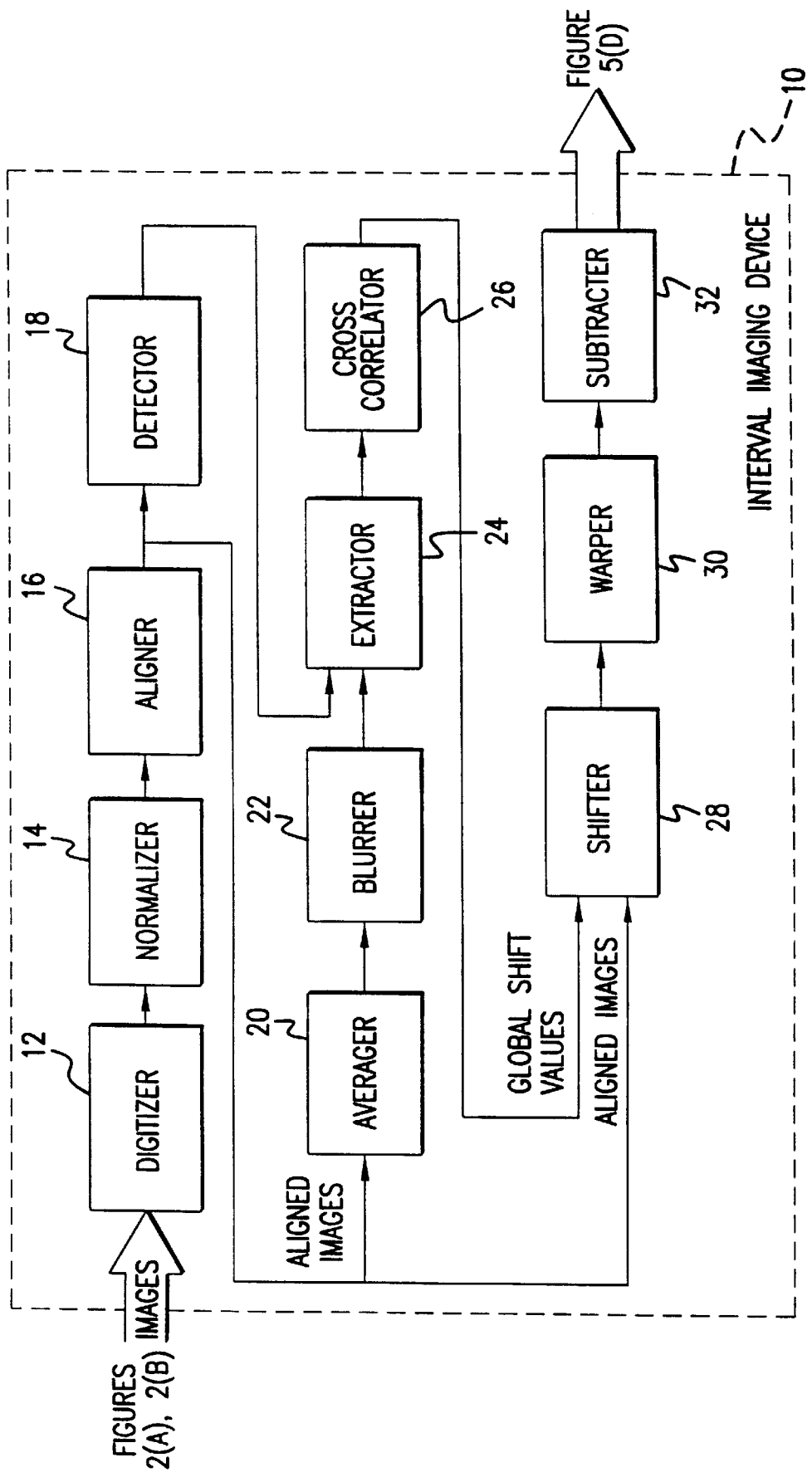
FIG. 1(c) is a block diagram of an interval detection device according to the present invention.

FIG. 1(c) is a block diagram illustrating an interval detection device 10 according to the present invention. The interval detection device inputs temporal radiographic images, such as FIGS. 2(a) and 2(b) into a digitizer 12. Digitizer 12 produces digital images which are then transferred to a normalizer 14.

The normalizer 14 normalizes density and contrast between the two digitized images. The normalized images are then transferred to an aligner 16 that rotates one or more of the normalized images to correct for lateral inclination. The aligned images are input to detector 18, an averager 20, and a shifter 28.

Edges of a common feature (rib cage edges, for example) in each of the aligned images are then detected by detector 18. The averager 20 produces low resolution images in 128×128 matrices. The low resolution images are then blurred by a blurrer 22 that performs a Gaussian function to smooth the images. A extractor 24 then segments a feature of interest (lungs, for example) from each of the images utilizing the edges detected by detector 18.

A cross-correlator 26 then performs a cross-correlation between areas of each of the segmented areas of interest, finding an area of highest correlation representing the global shift value. The global shift value and the aligned images are then input to a warper 30 that performs a non-linear geometric warping (see A. Kano et al.) of the images for further matching, taking into account the global shift value. The warped images are then input into a subtractor 30 that produces a subtraction image highlighting interval changes, such as FIG. 5(d).

Turning again to FIG. 6, it is seen that in a number of severe misregistration cases, which were subjectively rated as C, an improvement resulted from using the new initial image matching technique. However, for a small number of cases in groups A and B, the quality of subtraction images moderately declined for clinical usefulness using the new initial image matching technique. The present inventors have realized that if quality of subtraction images can be automatically estimated, the initial image matching technique can then be utilized only for poor subtraction cases such as those rated as C. Thus, the overall performance of the temporal subtraction scheme can be improved.

The present inventors have developed an automated method for estimating quality of subtraction images based on physical measures (instead of subjective ratings as applied in determining A, B and C above). The physical measures are an average contrast and a width of a histogram of pixel values for the subtraction image.

Figure 8A:
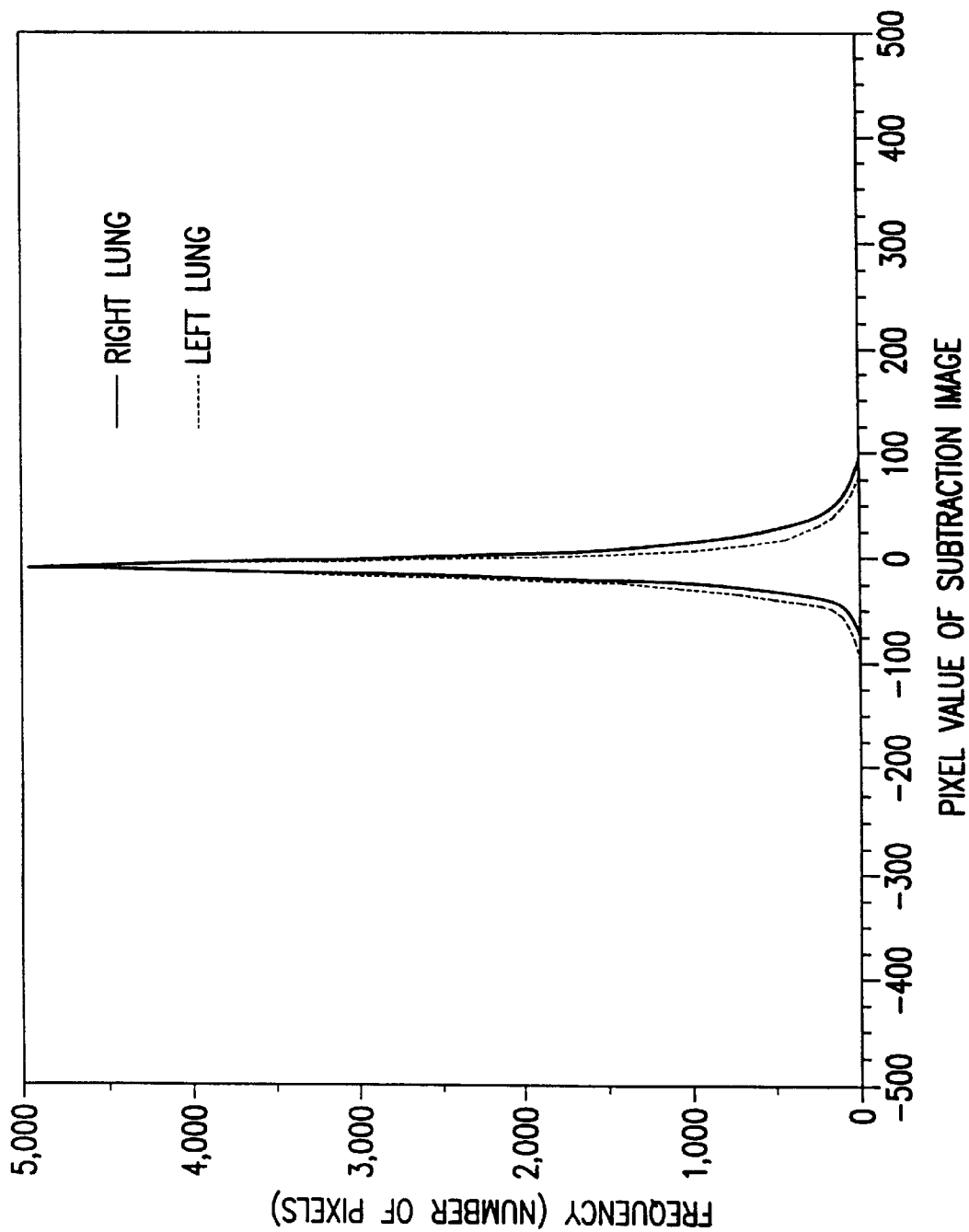
FIG. 8(a) is a graph illustrating a histogram of pixel values for left and right lung fields of a good temporal subtraction image.
Figure 8B:
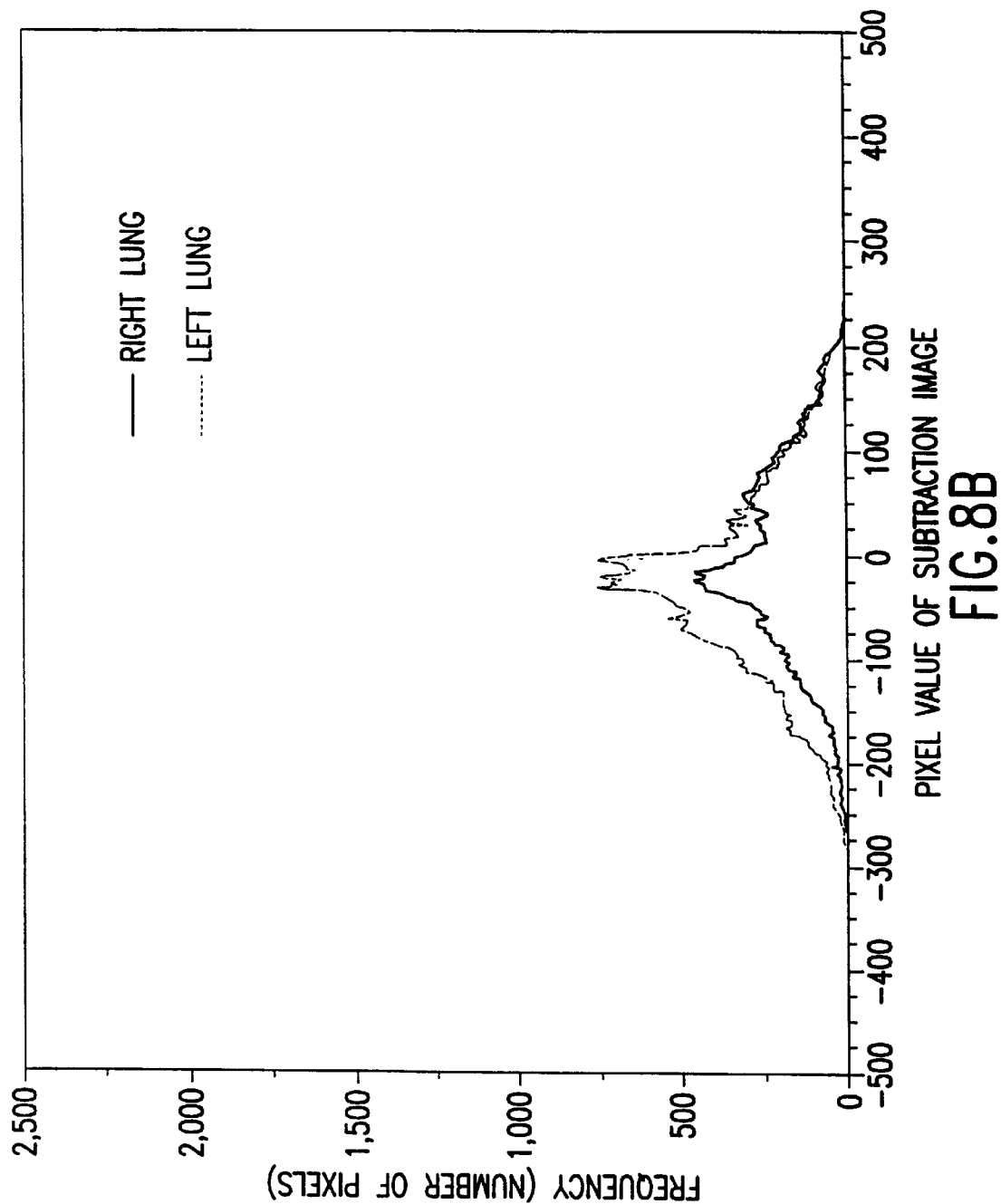
FIG. 8(b) is a graph illustrating a histogram of pixel values for left and right lung fields of a poor temporal subtraction image.

Since contrast of poor subtraction images tends to be high (i.e., poor subtraction images contain partly very dark and/or very light areas due to misregistration), the first physical measure was determined by an average contrast obtained by averaging of pixel values separately in each lung field of the subtraction image. FIGS. 8(a) and 8(b) show the histograms in the right and left lung fields of a good subtraction case and a poor subtraction case, respectively. As seen in FIGS. 8(a) and 8(b), histogram widths for the poor subtraction case are wider than those of the good subtraction case. The present inventors found that a width at a lower position of the histogram was very sensitive in detecting poor subtraction images. Therefore, the width of the histogram at 10% of a maximum level was determined as another physical measure for evaluating subtraction image quality.

Figure 9A:
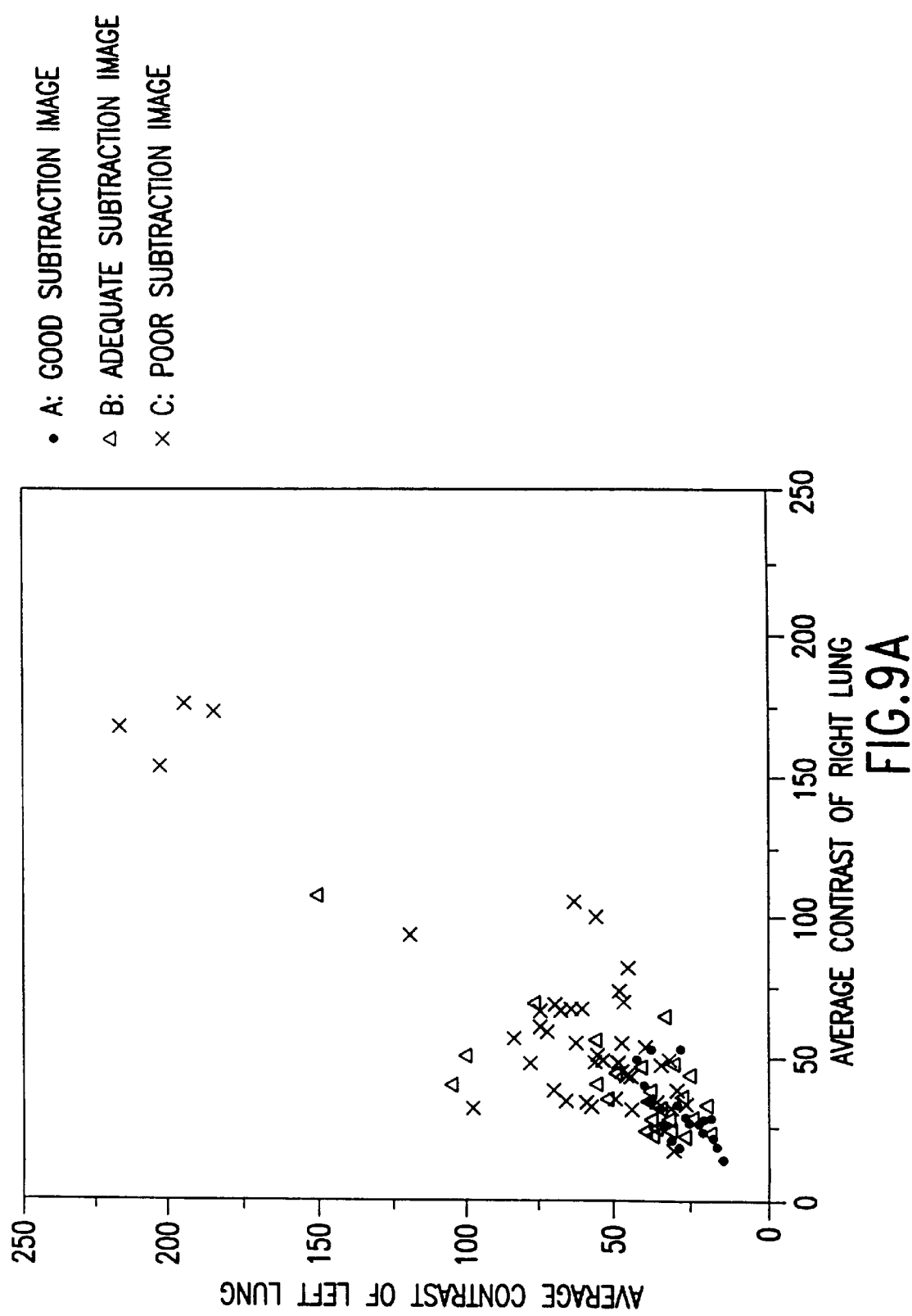
FIG. 9(a) is a graph illustrating a relationship of average contrast between right and left lung fields for 100 subtraction images.
Figure 9B:
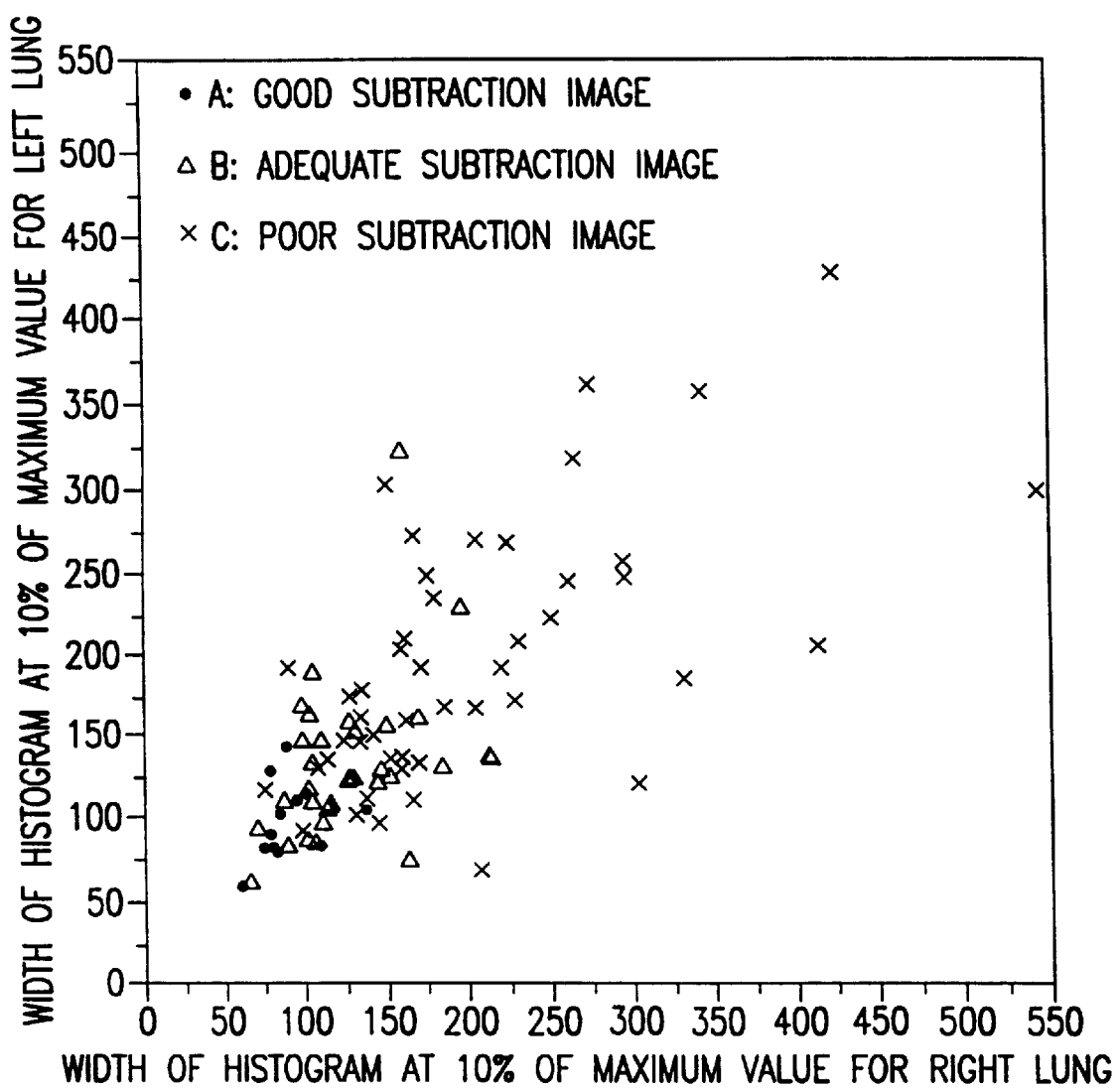
FIG. 9(b) is a graph illustrating a relationship of histogram width at 10% of a maximum value for right and left lung fields.

Average contrast and histogram width at 10% of maximum value are plotted in FIGS. 9(a) and 9(b) respectively. Horizontal and vertical axes in FIGS. 9(a) and 9(b) corresponds to the measures in the right and left lung fields, respectively. The good subtraction images (subjective rating: A) tend to be clustered at low average contrast and also at a narrow width of the histogram as shown in FIGS. 9(a) and 9(b). The distribution of the average contrast and the width of histogram for adequate subtraction images (subjective rating: B) is slightly shifted to the upper right area in these graphs. However, the average contrast and the width of the histogram of poor subtraction images (subjective rating: C) are distributed over a large average contrast and wide histogram widths.

Figure 9C:
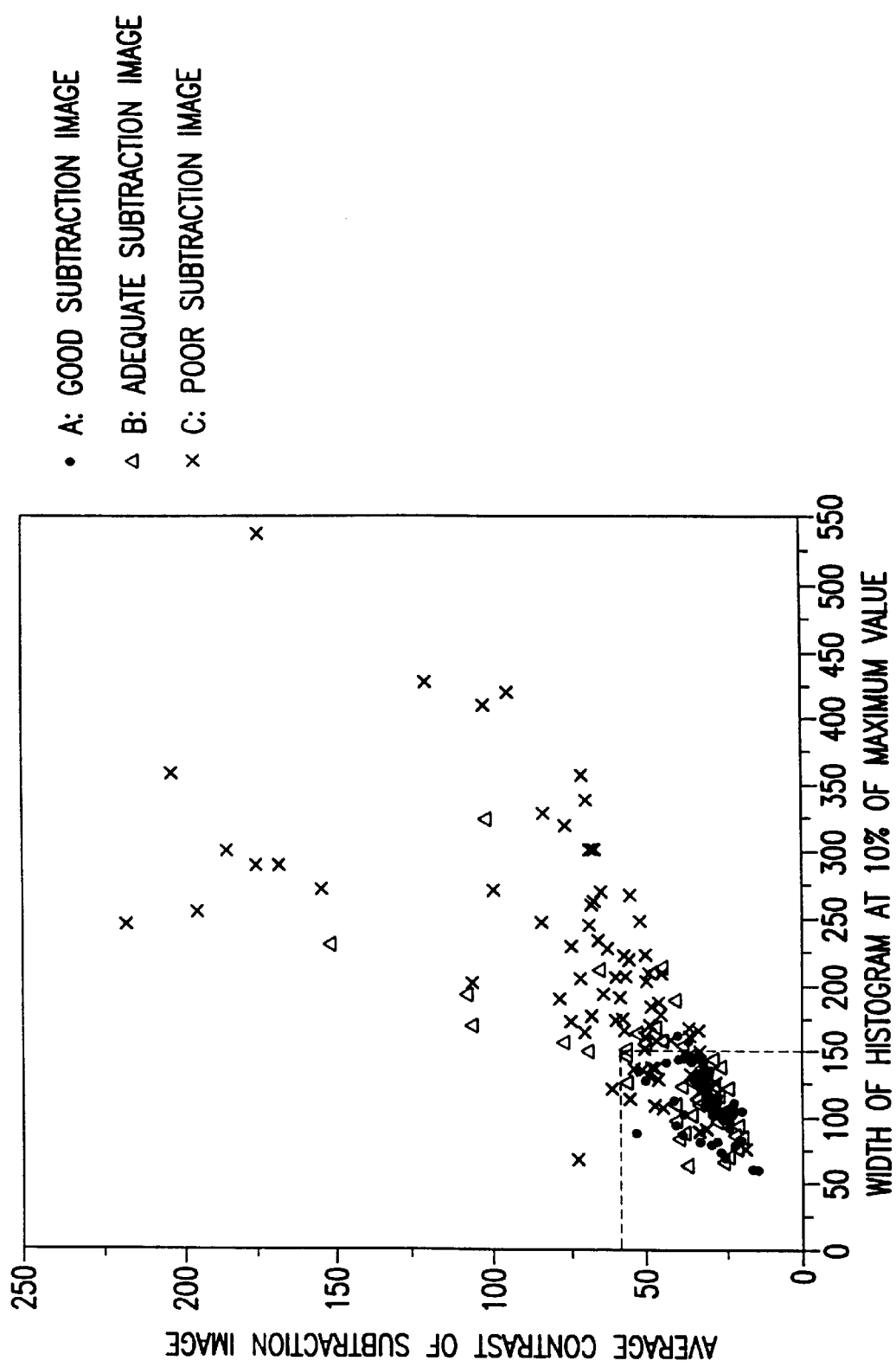
FIG. 9(c) is a graph illustrating a relationship between average contrast of a subtraction image and histogram width at 10% of the maximum value.

FIG. 9(c) illustrates a relationship between the average contrast and the width of the histograms. The dotted line in FIG. 9(c) indicates a potential threshold level (average contrast of 55 and histogram width of 150) for detection of poor subtraction images. Thus, temporal subtraction images can be automatically evaluated for determination of poor quality images.

Figure 12:
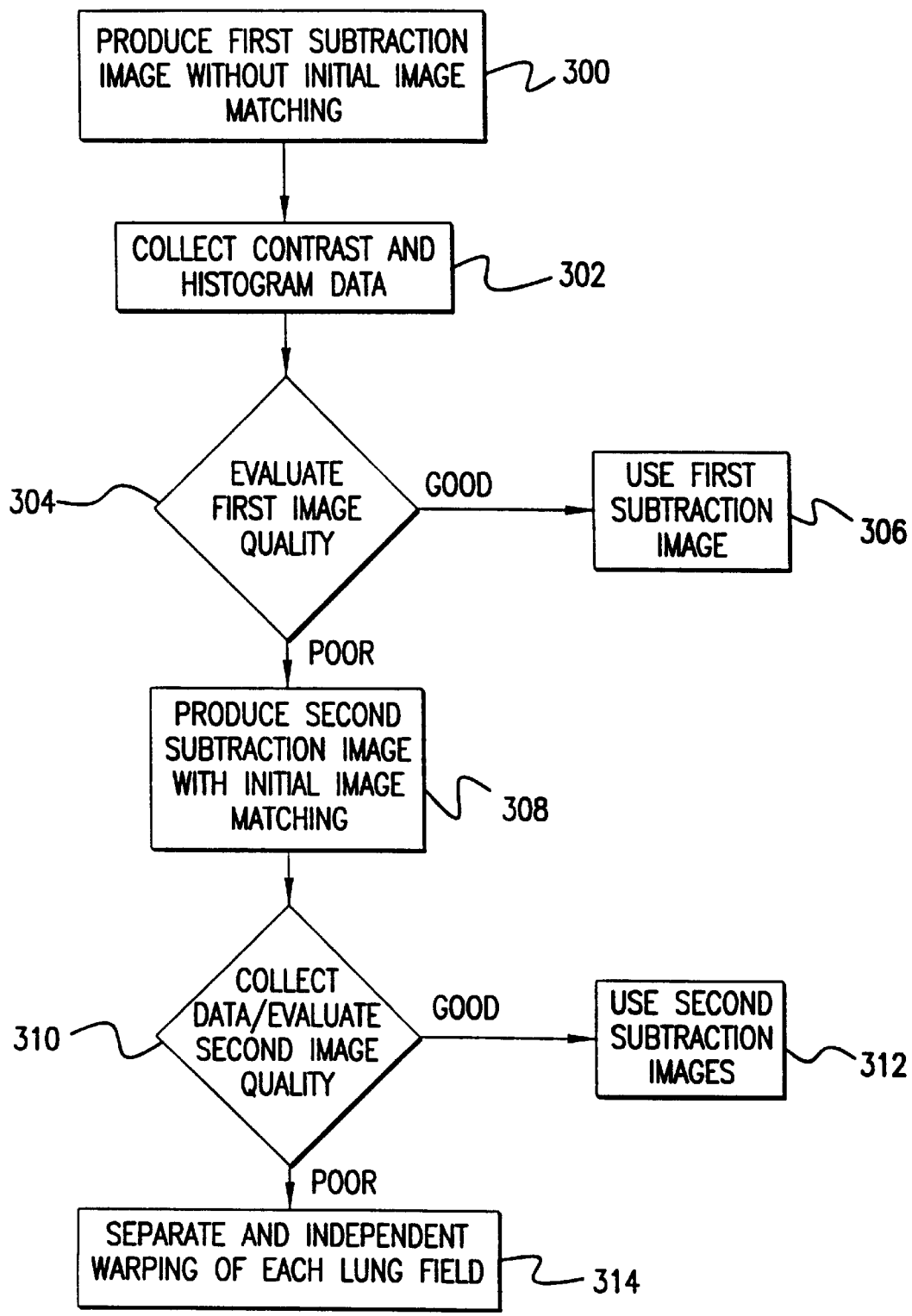
FIG. 12 is a flow chart illustrating the improved temporal subtraction method according to the present invention.

FIG. 12 is a flow chart illustrating a new temporal subtraction technique based on the above described information. At step 300, a first subtraction image is produced without initial image matching. At step 302, contrast and histogram data is collected on the first subtraction image, and at step 304, quality of the first subtraction image is evaluated based thereon.

If the data collected indicates a good quality (A or B) subtraction image, the first subtraction image is utilized (step 306). However, if the data indicates a poor quality subtraction image, a second subtraction image is produced utilizing the new initial image matching technique (step 308).

Figure 10A:
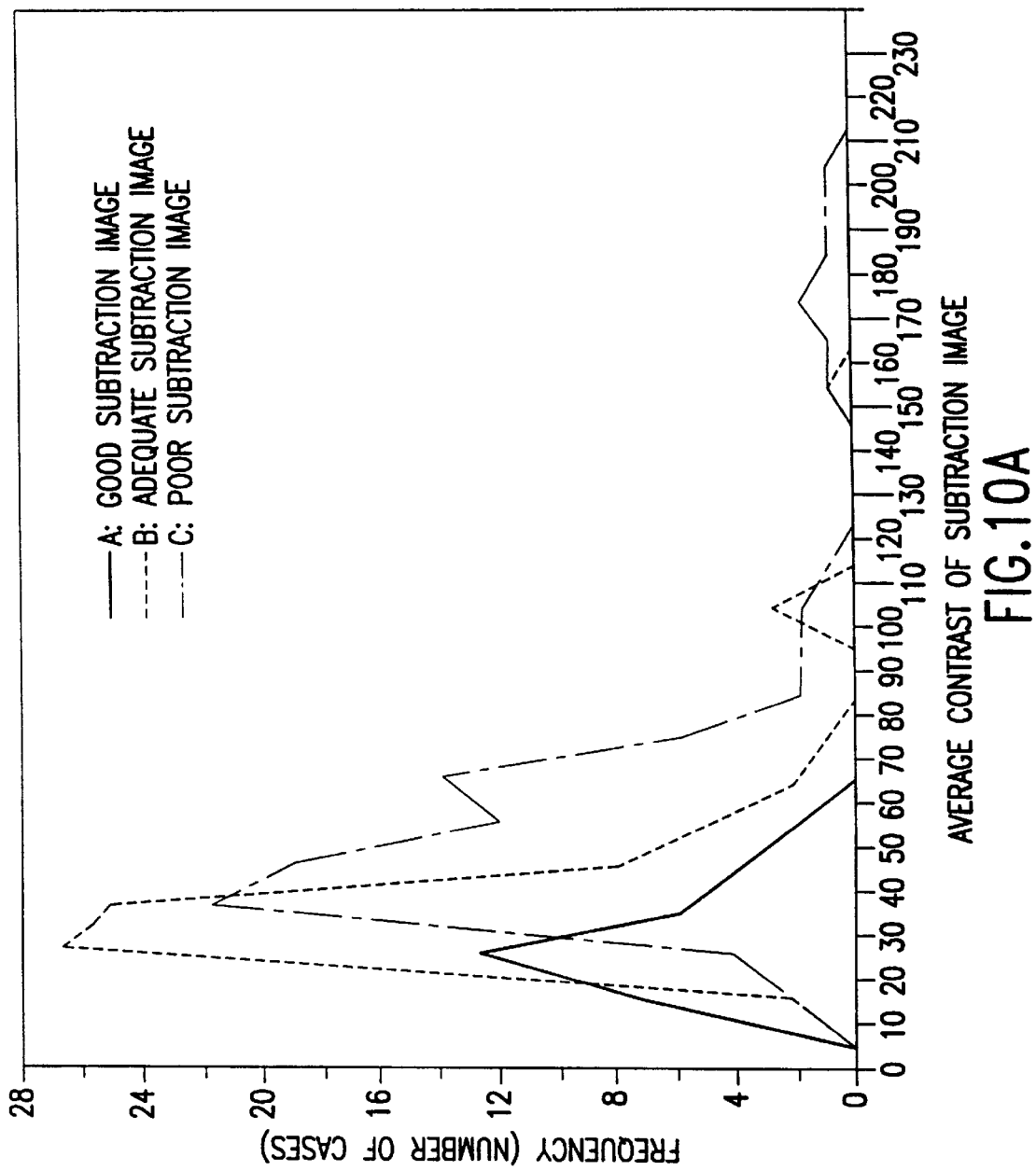
FIG. 10(a) is a graph illustrating distributions of average contrast for three groups of subtraction images obtained by a previous subtraction scheme.
Figure 10B:
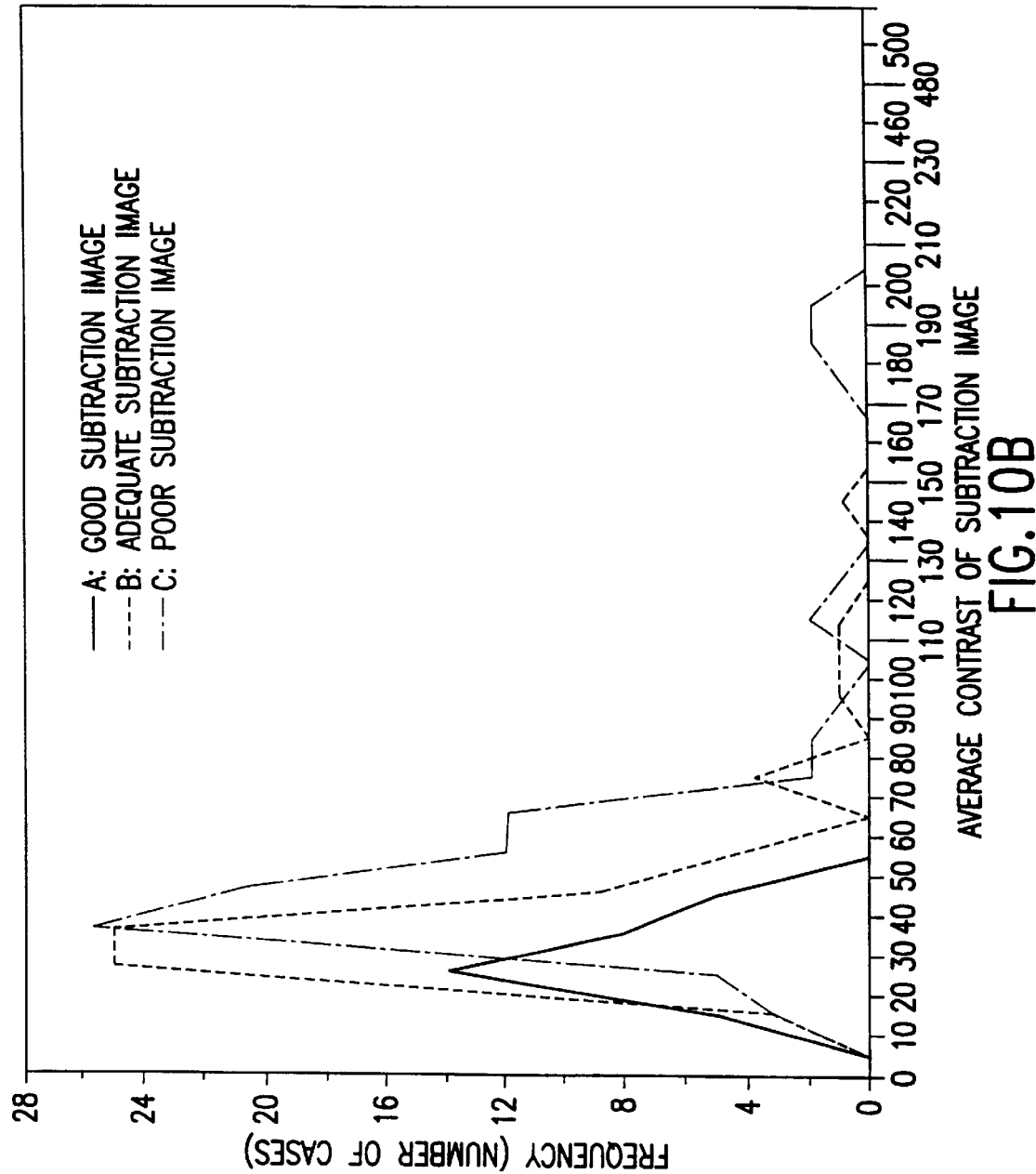
FIG. 10(b) is a graph illustrating distributions of an average contrast for three groups of subtraction images obtained by an improved temporal subtraction method according to the present invention.

The present inventors investigated quality of 100 subtraction images without and with the initial image matching considering average contrast values and the histogram widths. FIGS. 10(a) and 10(b) show distributions of the average contrast values for three groups of subtraction images without and with the initial image matching technique, respectively. FIGS. 11(a) and 11 (b) show a distribution of histogram widths for the three groups of subtraction images without and with the initial image matching techniques, respectively. The distributions for good and adequate subtraction cases without initial image matching (subjective rating: A and B) are similar to those for the cases with initial image matching. However, it is important to note that the distributions for poor subtraction cases (subjective rating: C) are shifted to the left with initial image matching. Therefore, the use of the new initial image matching technique tends to decrease both the average contrast and the histogram width of subtraction images, thus indicating improved subtraction image quality.

Continuing now with FIG. 12, at step 310, quality of the second subtraction image is evaluated. The second subtraction image is utilized if the evaluation indicates good quality (step 312). However, if subtraction image quality initial image matching is still poor, a second warping technique is employed as shown in step 314.

In the warping technique utilized to make the first subtraction image, shift values for X- and Y-direction are fitted by using a surface (curve) fitting technique. Fitting is performed using shift values obtained for all regions of interest (ROIs) over the entire lung field. In the second warping technique, however, surface fitting is performed for each lung field separately and independently. This method provides slightly improved subtraction images, probably because the surface fitting technique works more effectively on small areas of shift values (or small number of data set) such as provided in each lung field instead of both lungs together.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMS, EEPROMs, magnetic or optical cards, or any type of media suitable for storing electronic instructions. obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for detection of interval changes between first and second digital images, comprising the steps of:

converting the first and second digital images to first and second low resolution images of predetermined size;

blurring each low resolution image to produce first and second blurred images;

correlating pixel values of the first blurred image with pixel values of the second blurred image over plural shifted portions of the first blurred image;

determining a shift in position of said first blurred image which produces a maximum correlation in said correlating step and based thereon determining a global shift value representing a shift of said first digital image relative to said second digital image;

producing a warped image by performing non-linear warping on one of said first and second digital images using said global shift value further to match said first and second digital images; and performing image subtraction between the warped image and the other of said first and second digital images.

2. The method according to claim 1, wherein prior to said converting step, further comprising the steps of:

normalizing density and contrast between the digital images; and correcting lateral inclination present in the digital images via rotation, comprising, identifying a reference line in each digital image, determining an angle between the reference lines identified in each image, and rotating at least one of said digital images according to said angle so that said reference lines are in alignment.

3. The method according to claim 1, further comprising the steps of:

detecting edges of a common feature in each of the digital images prior to said converting step; and segmenting similar portions of each blurred image based on the detected edges;

wherein said step of determining a global shift value comprises the substep of determining a global shift value based on the segmented similar portions.

4. The method according to claim 1, wherein said step of converting includes the step of:

converting the digital images to a low resolution matrix with a size larger than 64×64.

5. The method according to claim 1, wherein said step of converting includes the step of:

reducing the digital images to a low resolution 128×128 matrix by averaging.

6. The method according to claim 1, wherein said step of blurring comprises the substeps of:

inputting each low resolution image into a Gaussian filter of a predetermined matrix size; and smoothing each low resolution image by a Gaussian function implemented by said Gaussian filter.

7. The method according to claim 1, wherein said step of determining a global shift value comprises scaling coordinates that identify the maximum correlation match by a correction factor to produce said global shift value, said correction factor based on a reduction of image size occurring when said digital images are converted to low resolution.

8. The method according to claim 1, wherein said step of performing non-linear warping comprises:

aligning corresponding portions of said first and second digital images, offset by said global shift value, in relation to corresponding anatomical features present in said first and second digital images;

performing cross-correlation mapping to produce a plurality of shift values indicative of differences in locations between corresponding anatomical features of said first and second digital images with respect to corresponding pixel locations of said first and second digital images;

fitting mathematically a predetermined surface to said shift values in order to compensate for errors introduced into said cross-correlation mapping; and shifting the anatomical features in one of said first and second digital images based on the corrected shift values.

9. The method according to claim 6, wherein said step of inputting comprises the substep of:

inputting each low resolution image into a Gaussian filter of greater than 5×5 matrix size.

10. The method according to claim 6, wherein said step of inputting comprises the substep of:

inputting each low resolution image into a Gaussian filter of 9×9 matrix size.

11. A computer readable medium on which is stored instructions that cause a computer system to detect interval changes between first and second digital images, by performing the steps of:

converting the first and second digital images to first and second low resolution images of predetermined size;

blurring each low resolution image to produce first and second blurred images, correlating pixel values of the first blurred image with pixel values of the second blurred image over plural shifted portions of the first blurred image;

determining a shift in position of said first blurred image which produces a maximum correlation in said correlating step and based thereon determining a global shift value representing a shift of said first digital image relative to said second digital image;

producing a warped image by performing non-linear warping on one of said first and second digital images using said global shift value further to match said first and second digital images; and performing image subtraction between the warped image and the other of said first and second digital images.

12. The computer readable medium of claim 11, wherein the stored instructions, prior to said converting step, further perform the steps of:

normalizing density and contrast between the digital images; and correcting lateral inclination present in the digital images via rotation, comprising, identifying a reference line in each digital image, determining an angle between the reference lines identified in each image, and rotating at least one of said digital images according to said angle so that said reference lines are in alignment.

13. The computer readable medium of claim 11, wherein the stored instructions, further perform the steps of:

detecting edges of a same feature in each of the digital images prior to said converting step; and segmenting similar portions of each blurred image based on the detected edges;

wherein said step of determining a global shift value comprises the substep of determining a global shift value based on the segmented similar portions.

14. The computer readable medium of claim 11, wherein the stored instructions performing the step of converting, comprises the substep of converting the digital images to a low resolution matrices with a size larger than 64×64.

15. The computer readable medium of claim 11, wherein the stored instructions performing the step of converting, comprises the substep of reducing the digital images to a low resolution 128×128 matrix by averaging.

16. The computer readable medium of claim 11, wherein the stored instructions performing the step of blurring, comprises the substeps of:

inputting each low resolution image into a Gaussian filter of a predetermined matrix size; and smoothing each low resolution image by a Gaussian function implemented by said Gaussian filter.

17. The computer readable medium of claim 11, wherein said stored instructions performing the step of determining a global shift value comprises scaling coordinates identifying the maximum correlation match by a correction factor to produce said a global shift value, said correction factor based on a reduction of image size occurring when said digital images are converted to low resolution.

18. The computer readable medium of claim 11, wherein said step of performing non-linear warping comprises:

aligning corresponding portions of said first and second digital images, offset by said global shift value, in relation to corresponding anatomical features present in said first and second digital images;

performing cross-correlation mapping to produce a plurality of shift values indicative of differences in locations between corresponding anatomical features of said first and second digital images with respect to corresponding pixel locations of said first and second digital images;

fitting mathematically a predetermined surface to said shift values in order to compensate for errors introduced into said cross-correlation mapping; and shifting the anatomical features in one of said first and second digital images based on the corrected shift values.

19. The computer readable medium of claim 16, wherein the stored instructions performing the step of inputting, comprises the substep of inputting each low resolution image into a Gaussian filter of greater than 5×5 matrix size.

20. The computer readable medium of claim 16, wherein the stored instructions performing the step of inputting, comprises the substep of inputting each low resolution image into a Gaussian filter of 9×9 matrix size.

21. A system for detection of interval changes between first and second digital images, comprising:

means for converting the first and second digital images to first and second low resolution images of predetermined size;

means for blurring each low resolution image to produce first and second blurred images;

means for correlating pixel values of the first blurred image with pixel values of the second blurred image over plural shifted portions of the first blurred image;

means for determining a shift in position of said first blurred image which produces a maximum correlation in said correlating step and based thereon determining a global shift value representing a shift of said first digital image relative to said second digital image;

means for producing a warped image by performing non-linear warping on one of said first and second digital images using said global shift values further to match said first and second digital images; and means for performing image subtraction between the warped image and the other of said first and second digital images.

22. The system according to claim 21, further comprising:

means for normalizing density and contrast between the digital images;

means for correcting lateral inclination of the digital images, comprising, means for identifying a reference line in each digital image, means for determining an angle between the identified reference lines, and means for rotating at least one of the digital images according to said angle so that said references lines are in alignment.

23. The system according to claim 22, further comprising:

means for detecting edges of a common feature in each of the digital images prior to converting by said converting means; and means for segmenting similar portions of each blurred image based on said edges detected.

24. The system according to claim 22, wherein:

said means for determining a global shift value comprises means for scaling coordinates that identify the maximum correlation match by a correction factor to produce said global shift value, said correction factor based on a reduction of image size occurring when said digital images are converted to low resolution images.

25. The system according to claim 24 wherein said means for performing non-linear warping comprises:

means for aligning corresponding portions of said first and second digital images in relation to corresponding anatomical features present in said first and second digital images;

means for performing cross-correlation mapping to produce a plurality of shift values indicative of differences in locations between corresponding anatomical features of said first and second digital images with respect to corresponding pixel locations of said first and second digital images;

means for fitting mathematically a predetermined surface to said shift values in order to compensate for errors introduced into said cross-correlation mapping; and means for shifting the anatomical features in one of said first and second digital images based on the corrected shift values.

26. The system according to claim 25, wherein said means for blurring comprises means for smoothing each low resolution image via a Gaussian filter of greater than 5×5 matrix size.

27. The system according to claim 26, wherein said means for producing low resolution images comprises means for reducing the digital images to low resolution matrices with a size greater than 64×64 by averaging.

28. The system according to claim 27, wherein:

said Gaussian filter is a 9×9 Gaussian filter; and said low resolution matrices are 128×128 in size.

29. A method of detecting interval changes between first and second digital images, comprising the steps of:

producing a first subtraction image from said first and second digital images without initial image matching;

extracting at least one objective measure of quality of said first subtraction image;

evaluating said at least one objective measure of quality of said first subtraction image; and producing a second subtraction image from said first and second digital images using initial image matching only if said at least one objective measure of quality of said first subtraction image indicates that the first subtraction image is of poor quality.

30. The method according to claim 29, further comprising the steps of:

extracting at least one objective measure of quality of said second subtraction image;

evaluating said at least one objective measure of quality of said second subtraction image; and producing a third subtraction image based on initially matched images from said initial image matching that includes separate and independent warping of plural selected fields present in each of the initially matched images.

31. The method according to claim 29, wherein said step of extracting comprises the substeps of:

collecting average contrast and histogram data according to pixel values in at least one field of said first subtraction image; and determining if said average contrast and histogram data exceed predetermined thresholds.

32. The method according to claim 30, wherein said step of extracting at least one objective measure of quality of said second subtraction image comprises the substeps of:

collecting average contrast and histogram data according to pixel values in at least one field of said second subtraction image; and determining if said average contrast and histogram data exceeds a predetermined threshold.

33. The method according to claim 30, wherein said step of producing a third subtraction image comprises:

performing separate and independent warping of each of plural selected lung fields present in said initially matched images to produce a third subtraction image.

34. An image processing apparatus, comprising:

a mechanism configured to convert the first and second digital images to first and second low resolution images of predetermined size;

a mechanism configured to blur each low resolution image to produce first and second blurred images;

a mechanism configured to correlate pixel values of the first blurred image with pixel values of the second blurred image over plural shifted portions of the first blurred image;

a mechanism configured to determine a shift in position of said first blurred image which produces a maximum correlation between the second blurred image and the first blurred image and based thereon determine a global shift value representing a shift of said first digital image relative to said second digital image;

a mechanism configured to produce a warped image by performing non-linear warping on one of said first and second digital images using said global shift value further to match said first and second digital images; and a mechanism configured to perform image subtraction between the warped image and the other of said first and second digital images.

35. The image processing apparatus according to claim 34, further comprising:

a mechanism configured to detect edges of a common feature in each of the digital images prior to said converting step; and a mechanism configured to segment similar portions of each blurred image based on the detected edges;

wherein said mechanism configured to determine a global shift value further comprises a mechanism configured to determine a global shift value based on the segmented similar portions.

36. The image processing apparatus according to claim 34, wherein the mechanism configured to blur comprises:
   a mechanism configured to input each low resolution image into a Gaussian filter of a predetermined matrix size; and
   a mechanism configured to smooth each low resolution image by a Gaussian function implemented by said Gaussian filter.

37. The image processing apparatus according to claim 34, wherein the mechanism configured to perform non-linear warping comprises;
   a mechanism configured to align corresponding portions of said first and second digital images, offset by said global shift value, in relation to corresponding anatomical features present in said first and second digital images;
   a mechanism configured to perform cross-correlation mapping to produce a plurality of shift values indicative of differences in locations between corresponding anatomical features of said first and second digital images with respect to corresponding pixel locations of said first and second digital images;
   a mechanism configured to fit mathematically a predetermined surface to said shift values in order to compensate for errors introduced into said cross-correlation mapping; and
   a mechanism configured to shift the anatomical features in one of said first and second digital images based on the corrected shift values.

38. In an image processing system, an improved method of determining a shift of one digital image relative to another digital image, the improvement comprising:
   converting the first and second digital images to first and second low resolution images of predetermined size;
   blurring each low resolution image to produce first and second blurred images;
   correlating pixel values of the first blurred image with pixel values of the second blurred image over plural shifted portions of the first blurred image; and
   determining a shift in position of said first blurred image which produces a maximum correlation in said correlating step and based thereon determining a global shift value representing a shift of said first digital image relative to said second digital image.

* * * * *